US007610364B2

(12) United States Patent
Kinyon et al.

(10) Patent No.: US 7,610,364 B2
(45) Date of Patent: Oct. 27, 2009

(54) METHOD FOR CONTROLLING THE OPERATION OF AT LEAST ONE SPECIFIC COMPUTING SYSTEM IN A NETWORK

(75) Inventors: Robert Kinyon, Tulsa, OK (US); Jollinus Salehy, Tulsa, OK (US); Chris Guzik, Tulsa, OK (US); Glenn Carr, Tulsa, OK (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 11/761,086

(22) Filed: Jun. 11, 2007

(65) Prior Publication Data

US 2007/0266124 A1    Nov. 15, 2007

Related U.S. Application Data

(62) Division of application No. 10/153,013, filed on May 21, 2002, now Pat. No. 7,254,624.

(60) Provisional application No. 60/292,617, filed on May 22, 2001.

(51) Int. Cl.
G06F 13/00 (2006.01)
(52) U.S. Cl. ...................................... 709/220
(58) Field of Classification Search ................. 709/220
See application file for complete search history.

(56) References Cited

U.S. PATENT DOCUMENTS 6,098,098 A    8/2000  Sandahl et al.
6,601,095 B1   7/2003  Duffield et al.

FOREIGN PATENT DOCUMENTS

CA    0509945    10/1992

OTHER PUBLICATIONS

Japanese Office Action for Japanese Patent Application No. 2002-591945, completed on Apr. 21, 2006, and mailed Apr. 25, 2006.
"The Points" of User Management—Efficient Registering, Editing and Changing of a User Account, Windows2000World, vol. 6, Issue 4, Apr. 1, 2001, pp. 117-128. (Translation of pp. 120-121, Section "Point 2 Try a function/tool suitable for setting user environment" and Fig. 10 only).
International Search Report from PCT/US02/16113 dated Nov. 1, 2002.
Canadian Office Action dated Apr. 11, 2008 regarding U.S. Appl. No. 2,440,476.

*Primary Examiner*—Robert B Harrell
(74) *Attorney, Agent, or Firm*—Alston & Bird LLP

(57) ABSTRACT

The systems and methods of the present invention provide for controlling the operation of at least one specific computing system in a network based upon the aspects of the computing system that are present for an operating session of a specific computing system by updating the configuration attributes in a base configuration file with configuration attributes contained in aspect configuration files that are associated with the specific computing system aspects, such as the specific computing element, the specific user of the computing element, the specific location of the computing element, and/or any other aspect of the computing system to generate a session configuration file for the operating session. Thus, a session configuration file may be created for any combination of aspects of the computing system associated with configuration files to properly set up the specific computing system, including any peripheral devices, for the particular operating session such that the computing element does not have to be separately configured.

16 Claims, 21 Drawing Sheets

METHOD FOR CONTROLLING THE OPERATION OF AT LEAST ONE SPECIFIC COMPUTING SYSTEM IN A NETWORK

CROSS-REFERENCE TO RELATED APPLICATIONS

This application is a divisional of U.S. application Ser. No. 10/153,013, filed on May 21, 2002, now U.S. Pat. No. 7,254,624, which claims priority from Provisional Application No. 60/292,617, filed May 22, 2001, which are hereby incorporated herein in their entirety by reference.

BACKGROUND OF THE INVENTION

The present invention relates to controlling the operation of computing systems, and in particular, to a method for controlling the operation of at least one specific computing system in a network by applying multiple configuration files associated with specific aspects of a current operating session.

Computing systems are typically implemented on either stand-alone or networked computing elements. In stand-alone computing elements, all of the static configuration and dynamic transaction data is stored and processed in one computing element, such as a computer, that is local to the user. This type of computing system generally requires that the computing element contain a significant amount of storage and processing capability, which may be costly. In addition, if there are any changes to the configuration data or other instructions that control the operation of the computing system, a user must physically access the computing element to make the changes. As such, if more than one stand-alone computing element must be accessed, then the changes become time-consuming and, therefore, expensive.

In networked computing elements, however, much of the static configuration and dynamic transaction data is stored and processed in a server that is remote from the computing element. FIG. 1 illustrates one embodiment of networked computing elements, where computing elements 22 are in communication with a server 28 via a network 26. The networked computing elements are advantageous because, instead of storing duplicate information on multiple stand-alone computing elements, any common data and application information may be stored in one central location, such as the server 28 or a storage element in communication with the network 26, that may be accessed by the computing elements. In addition, many of the changes to the common application and/or underlying data are much less time-consuming than to multiple stand-alone computing elements because one set of changes may be made at the central location without requiring physical access to each computing element.

With reference to FIG. 1, and as used herein, a computing system comprises computing elements 22, users of computing elements, locations of computing elements, and any other aspect of the computing system that may affect the functionality and/or the presentation of the computing elements. For instance, computing elements 32, 34 and 36 may be in different locations and different users may utilize the computing elements for various activities. Alternatively, the same users may utilize the computing elements in the different locations based upon the type of activity, work shift, day of the week, or other variable associated with the user's utilization of the computing elements. In addition, there may be characteristics of the computing elements, users, locations, etc of the computing system that are common to all or most of the operating sessions initiated on the computing elements, while there may be other characteristics of a specific computing element, user, location, etc that are specific to the particular operating session of the computing system.

Thus, in any type of computer system implementation, the computing element must access configuration data, which includes instructions for the computing element that define, among other things, the presentation of information to users accessing the computing element, the peripheral devices with which the computing element communicates, the rules for processing information received from users, and any other type of instruction regarding the functionality of the computing system. In general, the configuration data is stored in configuration files that are associated with either a particular computing element or a particular user. Therefore, when a user logs onto a computing element in the computer system, the computing element receives its configuration instructions from either a computing element configuration file or user configuration file. Typically, the configuration files associated with particular computing elements or users include both the general instructions common to all of the computing elements and/or users of the computing system and the instructions specific to the particular computing element and/or user.

Configuration files associated with a computing element contain instructions regarding how the computing element is to be configured each time a user logs onto the computing element, regardless of the identity of the user. Thus, each time any user logs onto a particular computing element, that computing element is configured in the same manner. If a particular user that logs onto the computing element desires a different or customized configuration, then that user must manually configure the computing element accordingly each time that user logs onto the computing element, which is time consuming for the user. In addition, if the general configuration attributes change, then each configuration file typically must be separately accessed and changed by a user and/or a system administrator, which, again, is time-consuming and laborious for the user and/or system administrator.

Configuration files associated with a user, on the other hand, contain specific instructions regarding how a computing element 22 is to be configured each time that particular user logs onto a computing element 22, regardless of the identity of the computing element. Thus, each time a particular user logs onto any computing element in the computing system, the computing element is configured according to that user's configuration file. This type of configuration works well if the user's responsibilities never change in relation to the particular computing element they are using. If, however, particular computing elements in the computing system are to be used for certain activities while other computing elements are to be used for other activities, and the user moves to the various computing elements to perform those activities, then each time the user changes computing elements, the computing element is configured for the particular user, but not for the particular activity assigned to the computing element. As such, the user must manually configure the computing element for the certain activity assigned to the computing element each time the user logs onto a computing element, which, again, is time consuming for the user.

One way to prevent a user from having to configure at least part of the computing element each time that user logs onto a computing element in a computing system where the computing element may be assigned certain activities, is to hard-code the computing elements with the certain instructions for the activity to which the computing element is assigned, then the computing element may receive information from a configuration file associated with the particular user. In this situation, however, if the activity assigned to a particular computing element ever changes, then an administrator must physically access the computing element to change the instructions hard-coded in the computing element, which is a time consuming and labor intensive process for an administrator.

Thus, there is typically no way to dynamically configure any given computing element in a computing system with instructions that take into account the activity associated with the computing element and the particular user logging onto the computing element without tying the configuration to either the user or the computing element. In addition, there is typically no efficient way to configure computing elements for the general instructions that apply to all or most of the computing elements and/or users in the computing system and the specific instructions that apply to a small group or an individual computing element or user in the computing system. As such, the user and/or the computing system administrator must perform a relatively significant amount of configuration after logging onto a computing element and a relatively significant amount of work in order to change any existing configuration files regardless of whether the computing element has access to a user configuration file, a computing element configuration file, or whether the user configuration file is combined with a hard-coded configuration.

In light of the considerations detailed above, there is a need in the computing industry for the ability to efficiently and dynamically control the operation of at least one specific computing system in a network, including particular computing element functions and/or any other aspect of the overall computing system, such that the user of the computing element and/or the administrator of the computing system do not have to consume time and labor performing the configurations each time the user logs onto the particular computing element or when the existing configuration files change. In addition, there are instances when it would be advantageous to configure specific computing systems differently based upon the location of the computing element, the day of the week, or any other aspect of the computing system in addition to the different configurations based upon the particular user and the activities associated with the computing element. The conventional configuration techniques, however, typically do not provide, and, thus, there is a need for, an efficient way to customize computing system configurations by providing configurations based upon any and all desired aspects of the computing system.

BRIEF SUMMARY OF THE INVENTION

The systems and methods of the present invention provide for efficiently controlling the operation of at least one specific computing system in a network based upon the aspects of a specific computing system that are present for a specific operating session. Session configuration files are generated for the operating session by updating the configuration attributes in a base configuration file with configuration attributes contained in aspect configuration files that are associated with the specific aspects of a specific computing system, such as a specific computing element, the specific user of the computing element, the specific location of the specific computing element, and/or any other aspect of the computing system. Thus, in various embodiments, a session configuration file may be created for any combination of aspects of the specific computing system associated with configuration files to properly set up the specific computing system, including any peripheral devices, for the particular operating session such that a user and/or administrator does not have to separately configure the computing system.

Certain embodiments of the systems and methods for controlling the operations of a specific computing system based on certain aspects of the computing system include generating the session configuration by updating configuration attributes contained in the base configuration file with configuration attributes contained in the aspect configuration files in a predetermined sequence. Thus, the configuration attributes in the aspect configuration files later in the sequence may overwrite the configuration attributes of the base configuration file and the configuration attributes of the aspect configuration files earlier in the sequence. Further embodiments include activating selected configuration attributes in the aspect configuration files, such that activated configuration attributes contained in aspect configuration files later in the sequence may overwrite the configuration attributes contained in the base configuration file and any aspect configuration file earlier in the sequence. In addition, the base configuration file and/or the aspect configuration files may include scripts that define certain operations of a specific computing system requiring the processing element of the present invention to implement an action, such that if the computing system is requested to perform a certain operation, the processing element implements the action associated with the script.

Examples of the aspect configuration files are configuration files associated with computing elements of the computing system, users of the computing elements, and locations of the computing elements. The associations between the aspect configuration files and the aspects of the computing system, such as the computing elements, users, and locations of the computing elements, may be defined in an associations table that may be accessed by the processing element of the present invention in order to identify the appropriate aspect configuration files with which to update the base configuration file. In addition, there may be more than one configuration file associated with each aspect of the computing system. Thus, a first aspect configuration file may contain general configuration attributes while a second configuration file associated with the same aspect as the first aspect configuration file contains specific configuration attributes. In this embodiment, the session configuration file generated from at least the first and second aspect configuration files contains both general and specific configuration attributes.

The generation of the session configuration file by updating a base configuration with at least one aspect configuration therefore provides for efficiently and effectively controlling the operations of a specific computing system to customize a particular operating session of the computing system to the particular user, the particular computing element, the particular location, and/or any other aspect of the computing system that affects the configuration of the computing system. As such, the user and/or the administrator does not have to expend time and labor to configure the computing element after the user initiates an operating session of a specific computing system because the session configuration file includes all of the appropriate configuration attributes.

BRIEF DESCRIPTION OF THE SEVERAL VIEWS OF THE DRAWINGS

Figure 1:
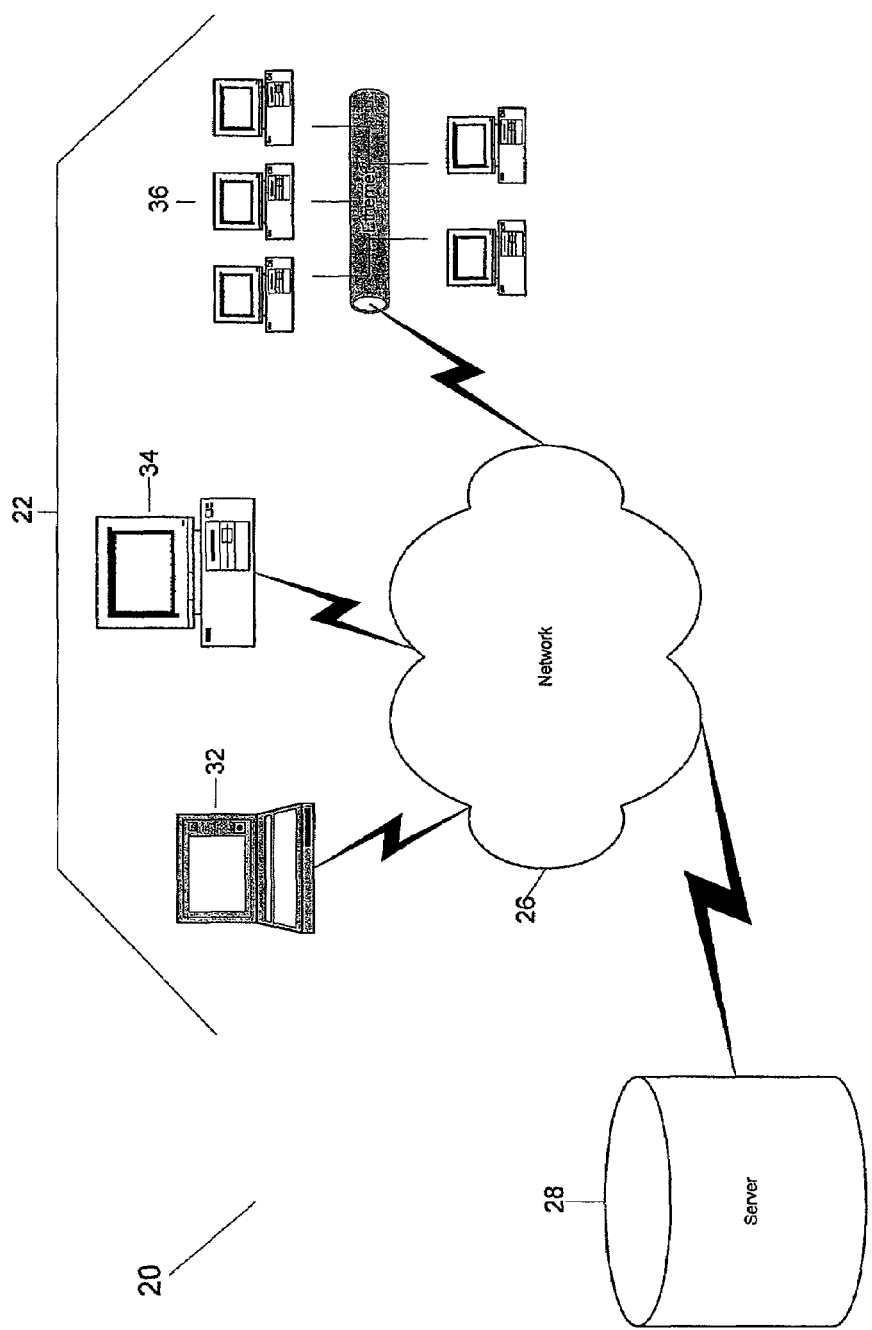
Figure 2:
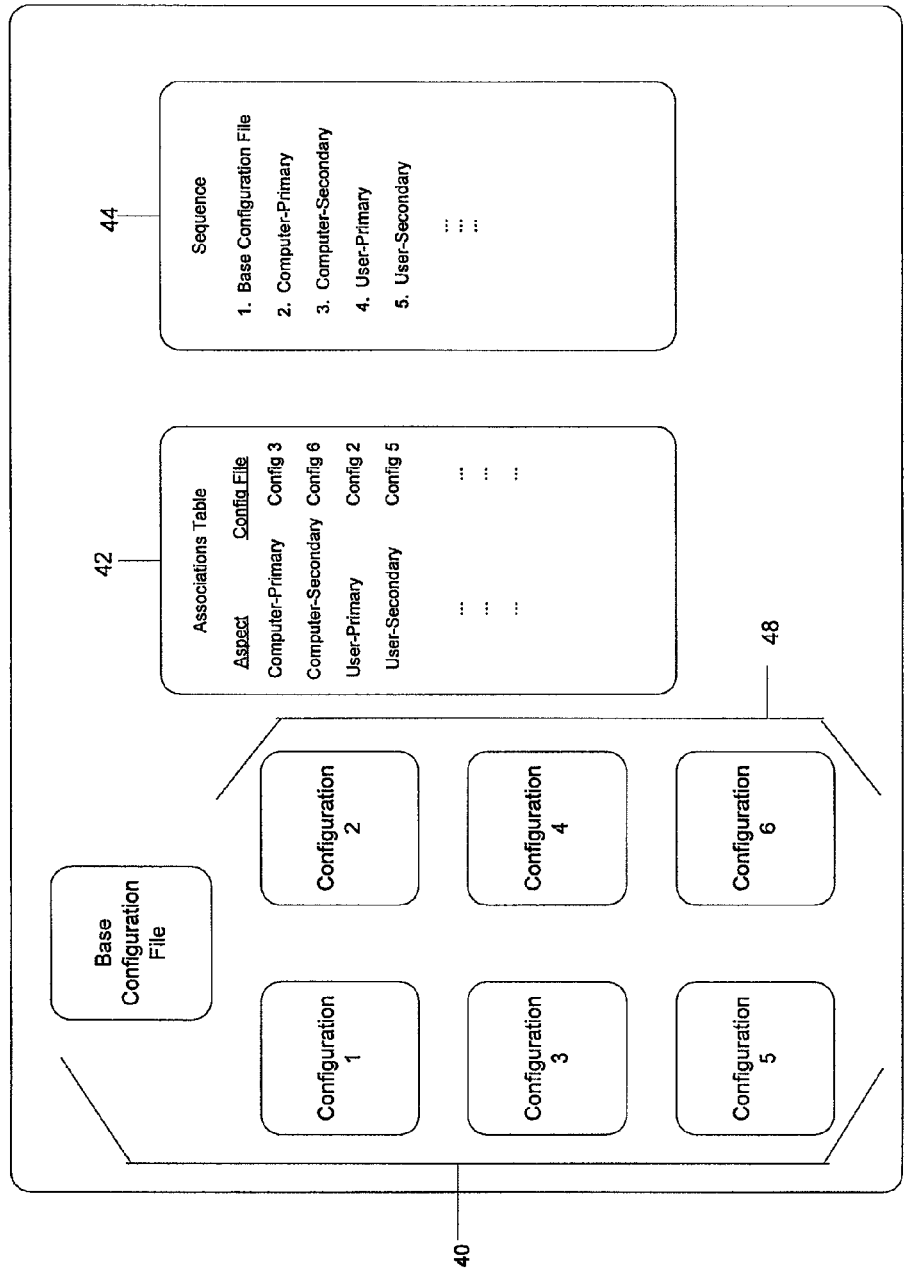
Figure 3A:
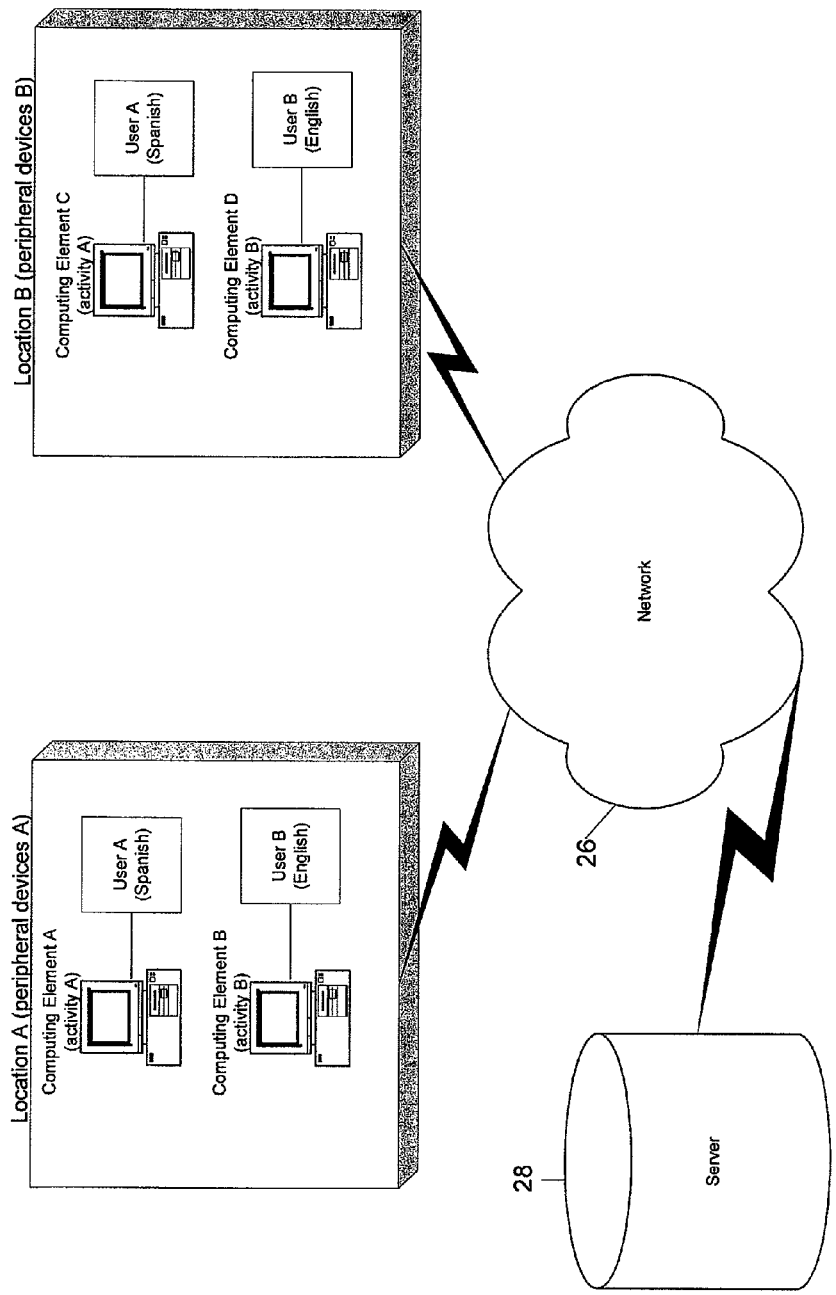
Figure 3B:
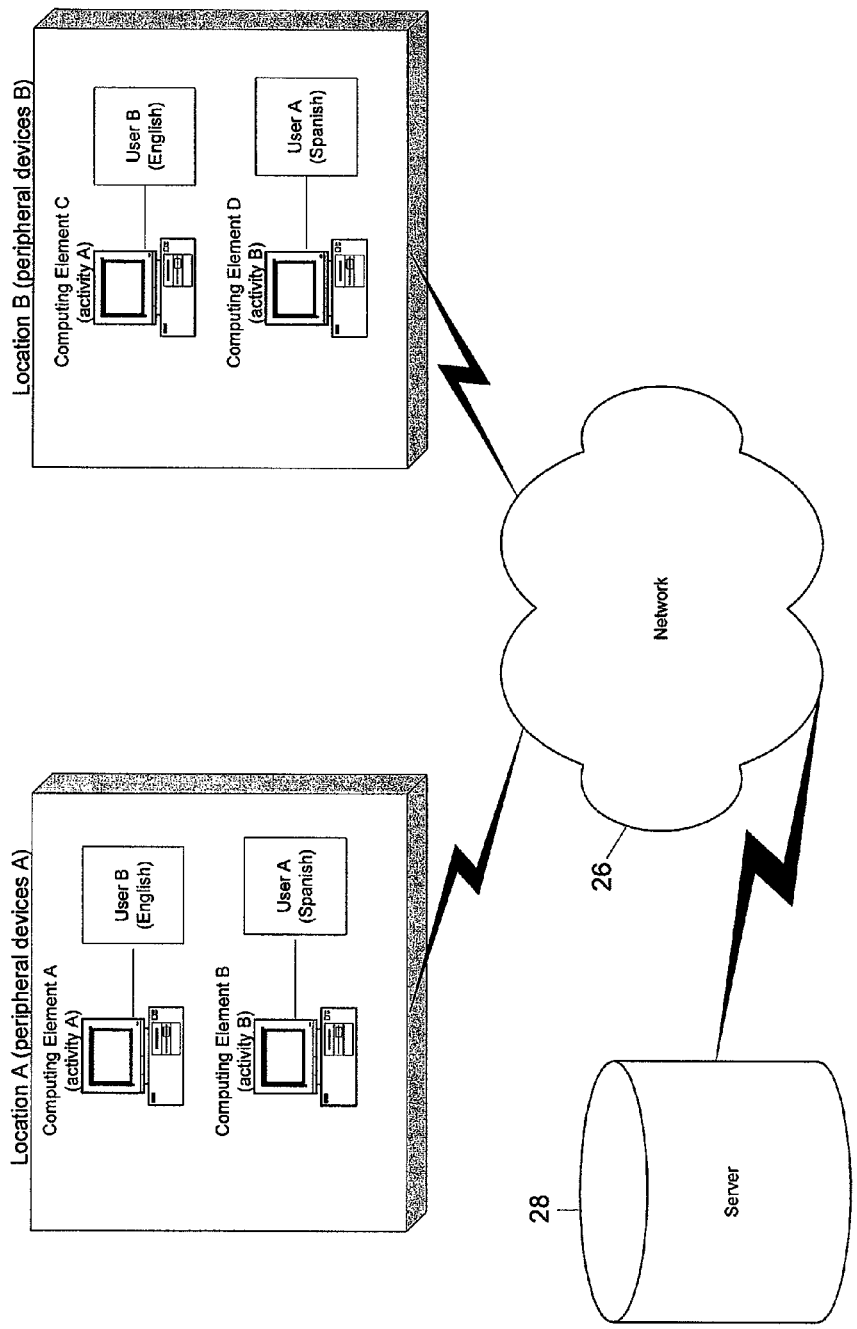
Figure 4A:
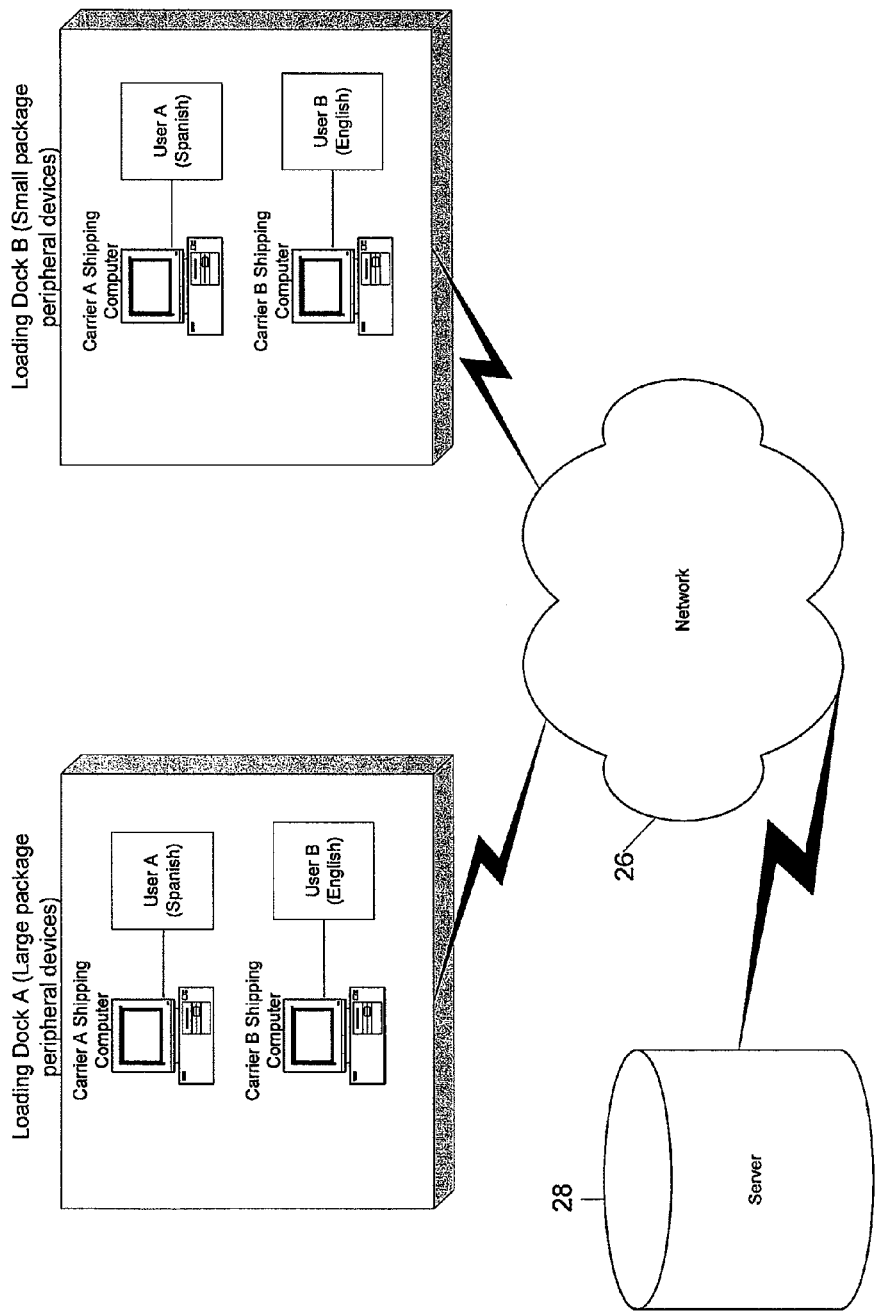
Figure 4B:
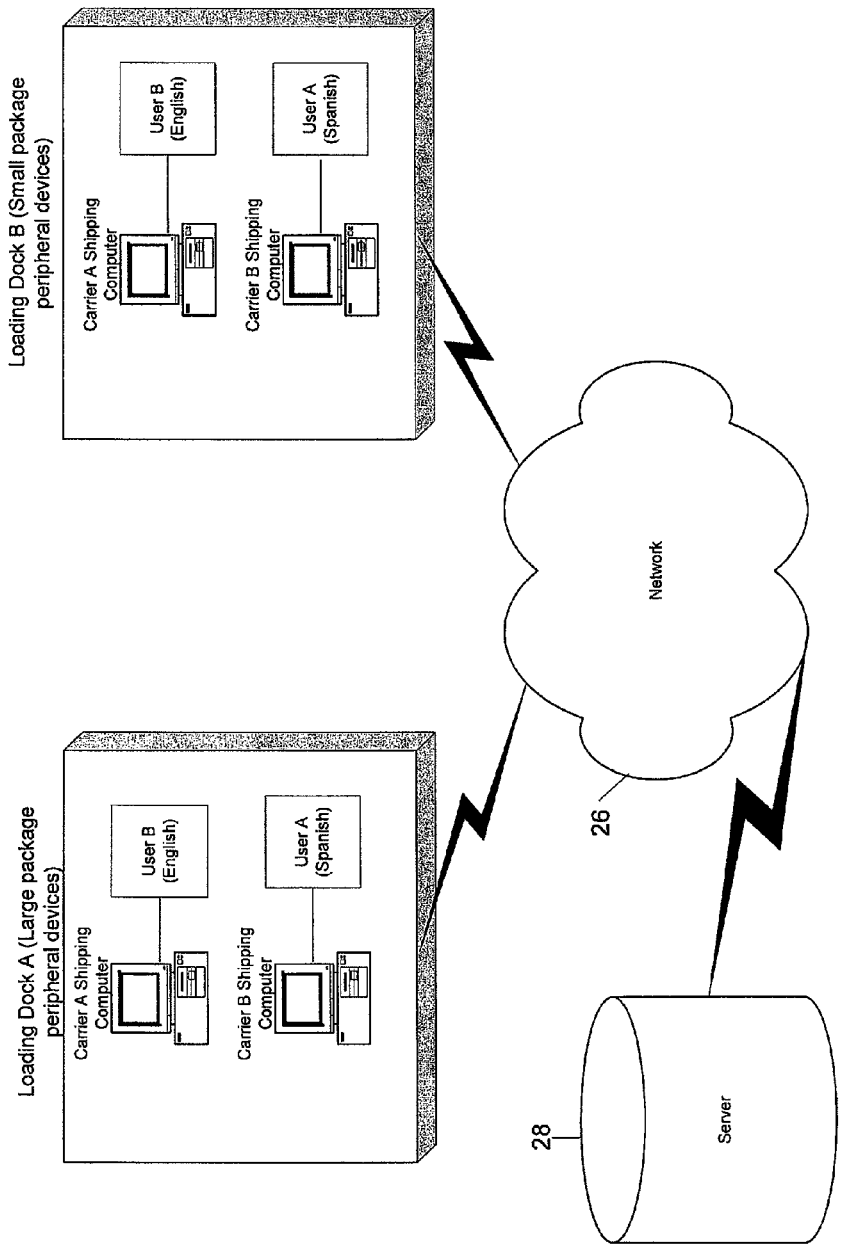
Figure 5:
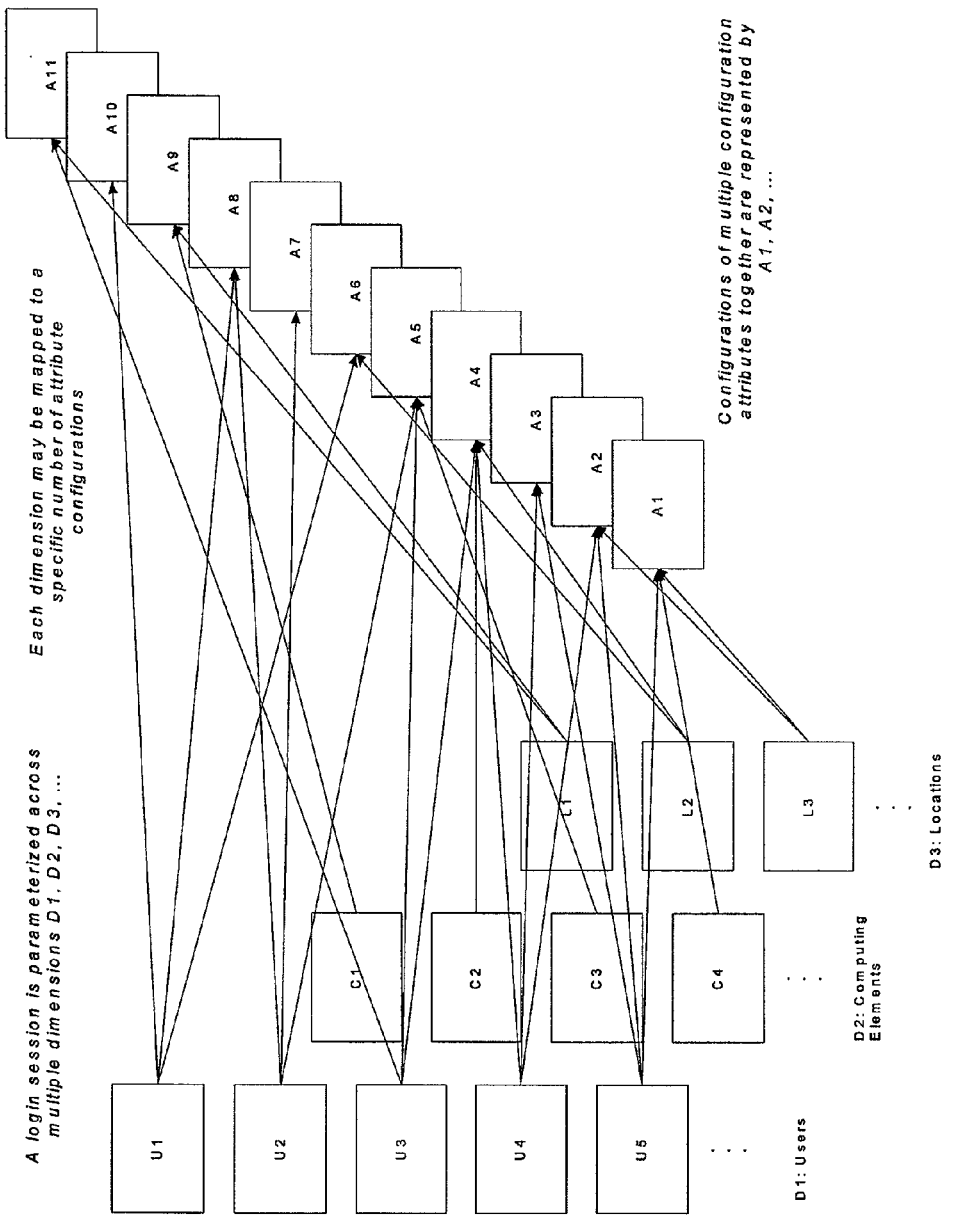
Figure 6:
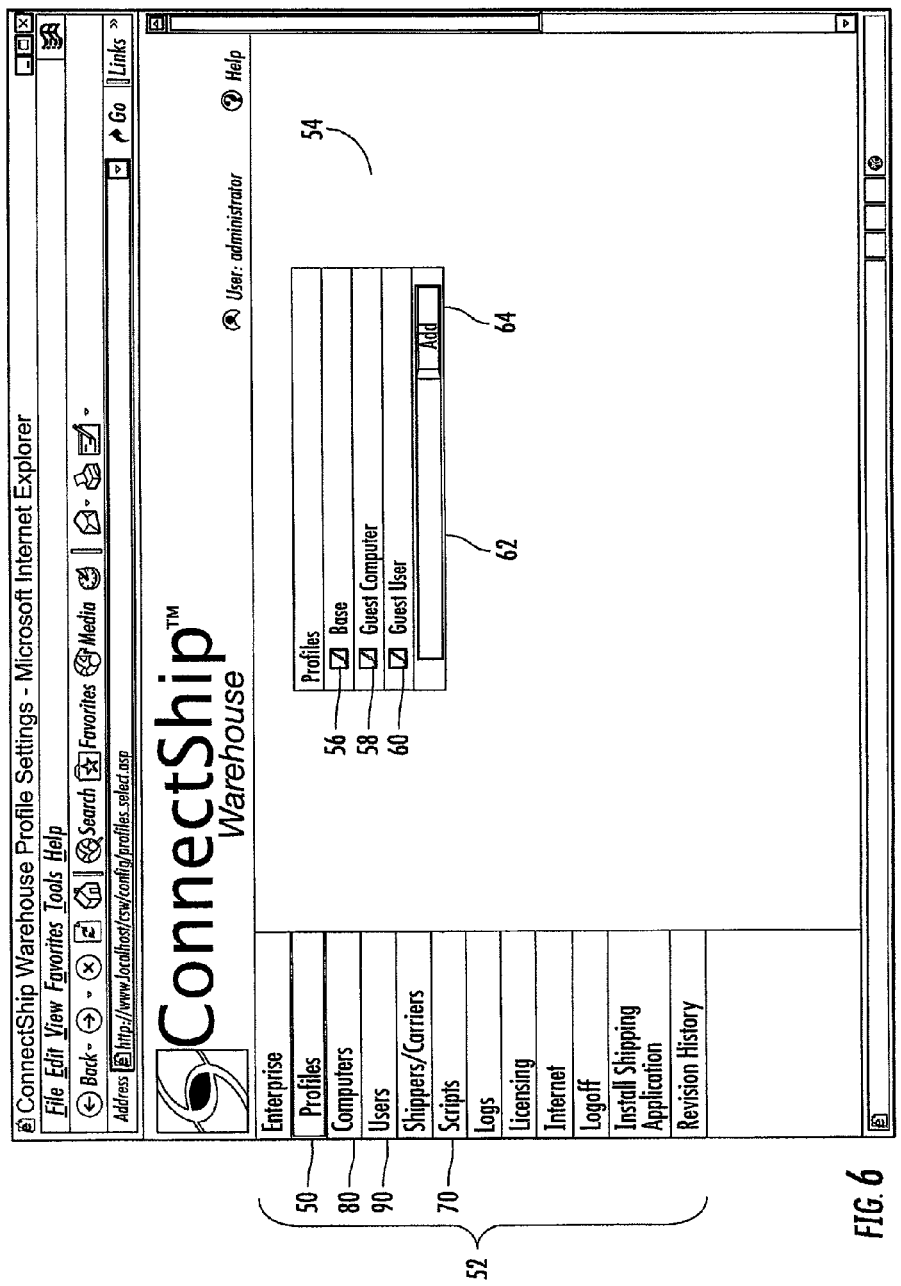
Figure 7:
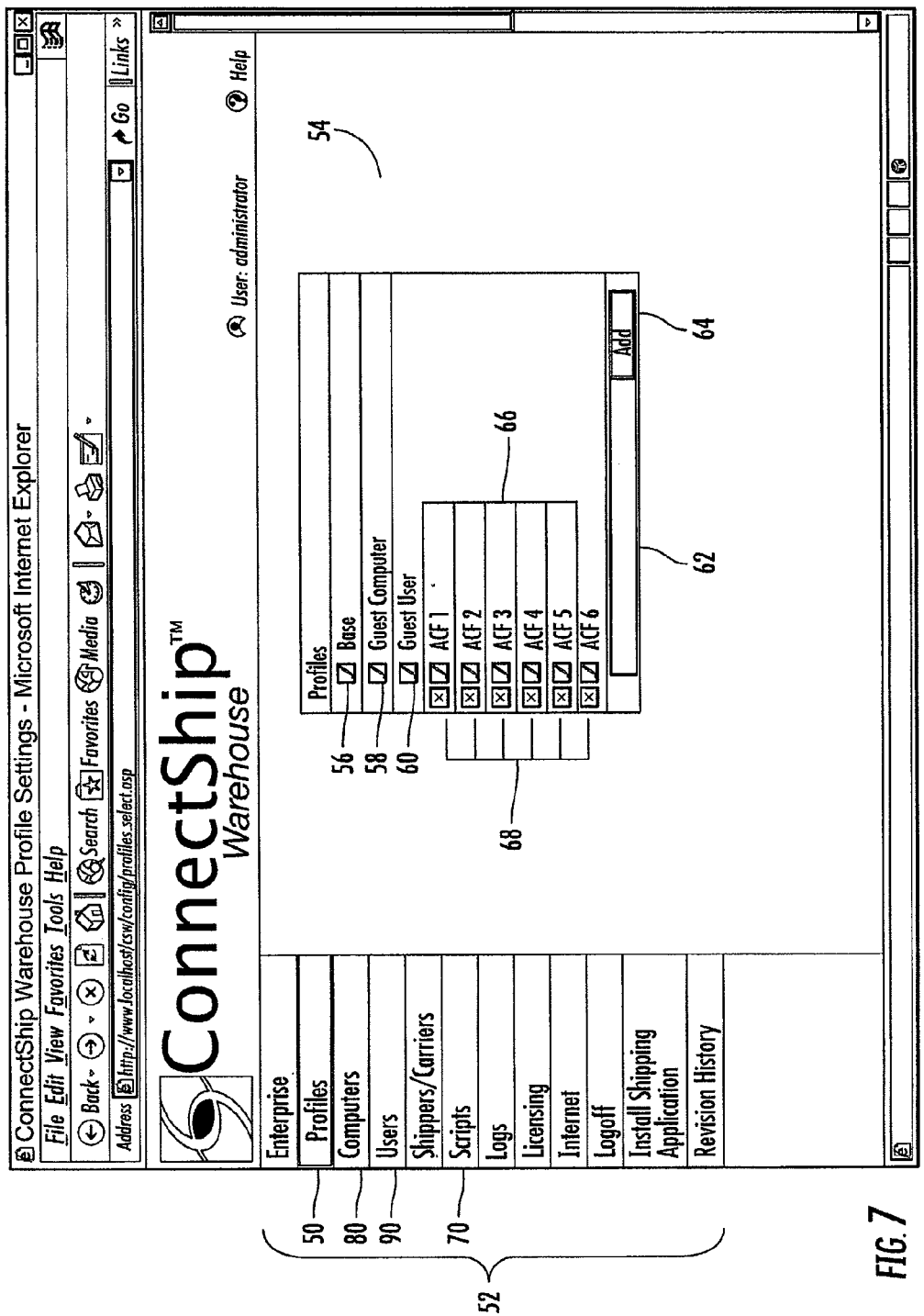
Figure 8A:
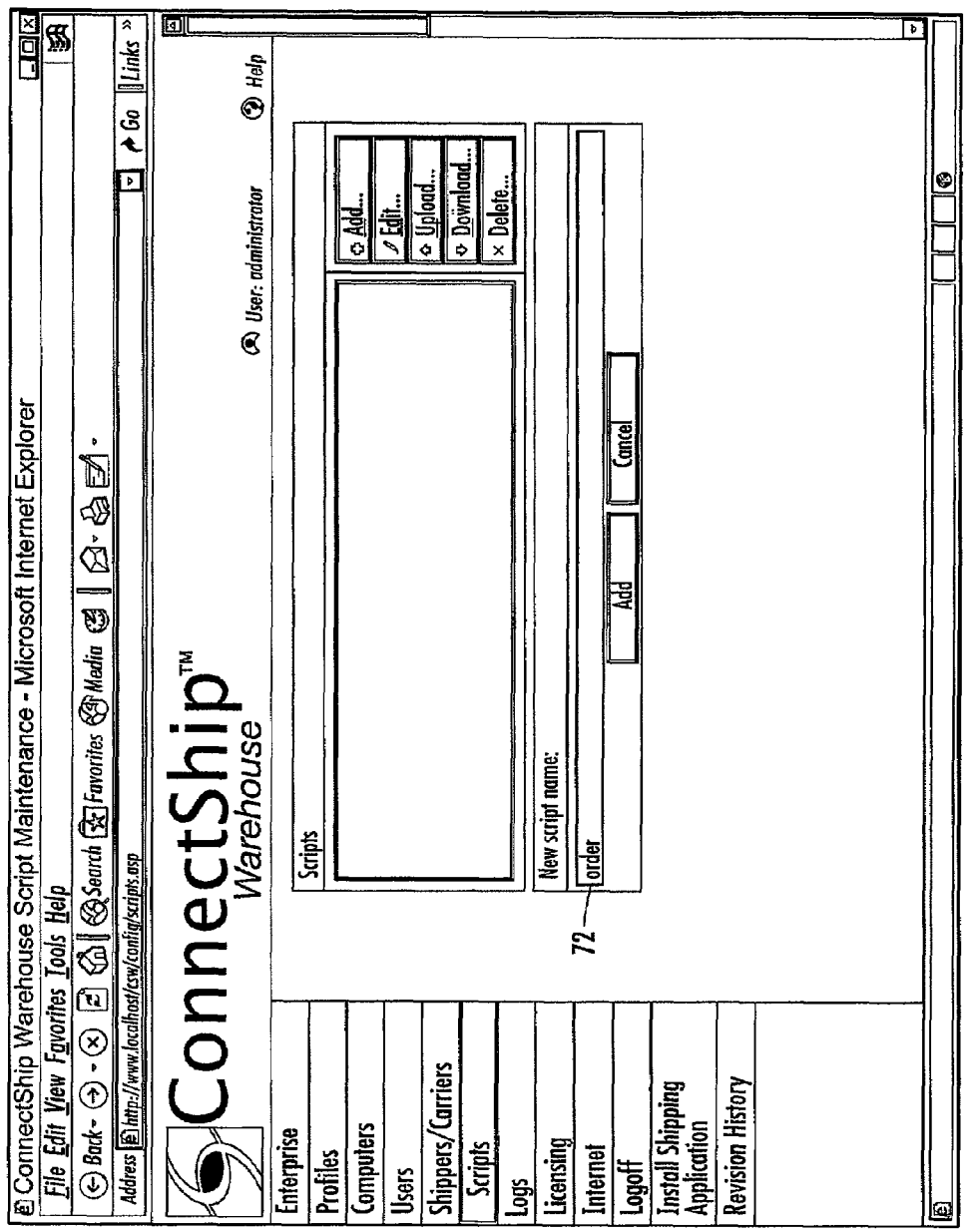
Figure 8B:
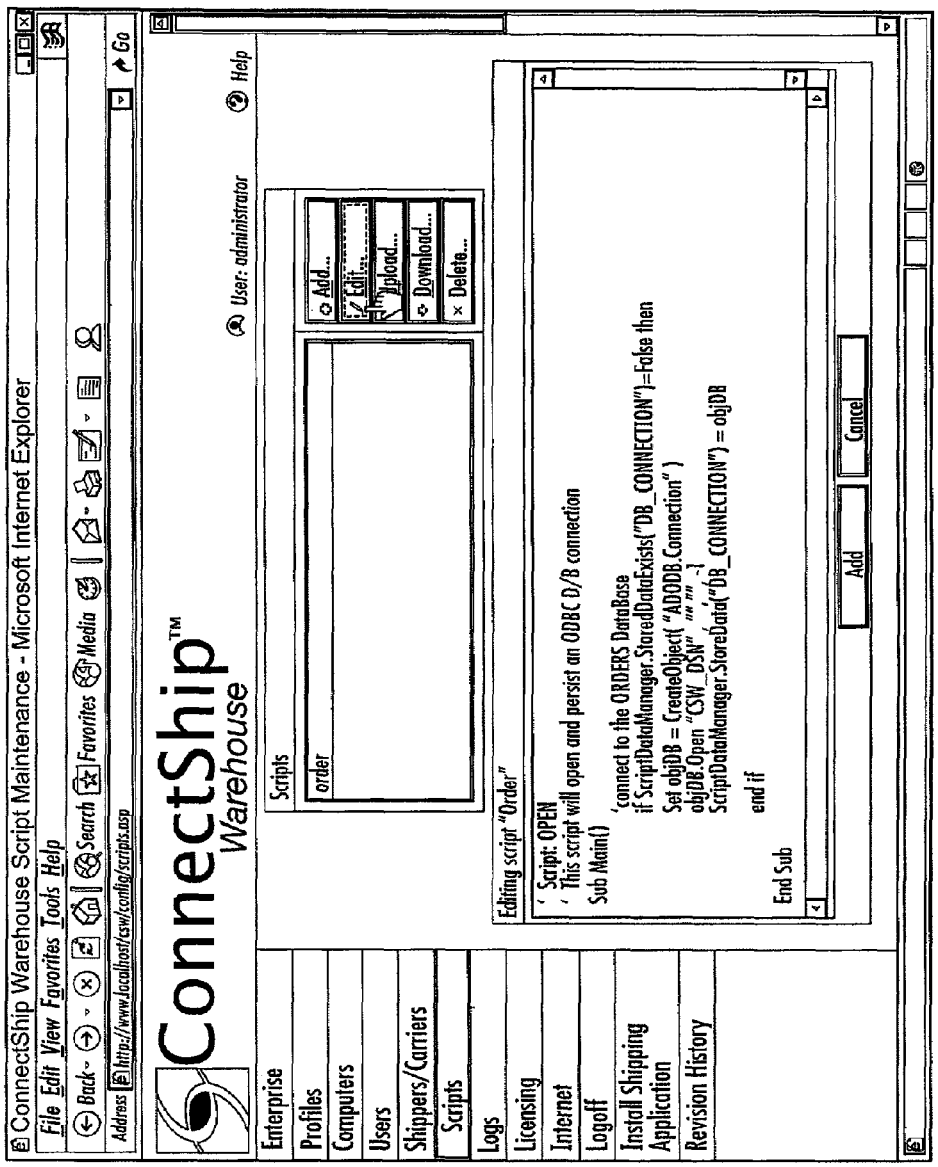
Figure 9A:
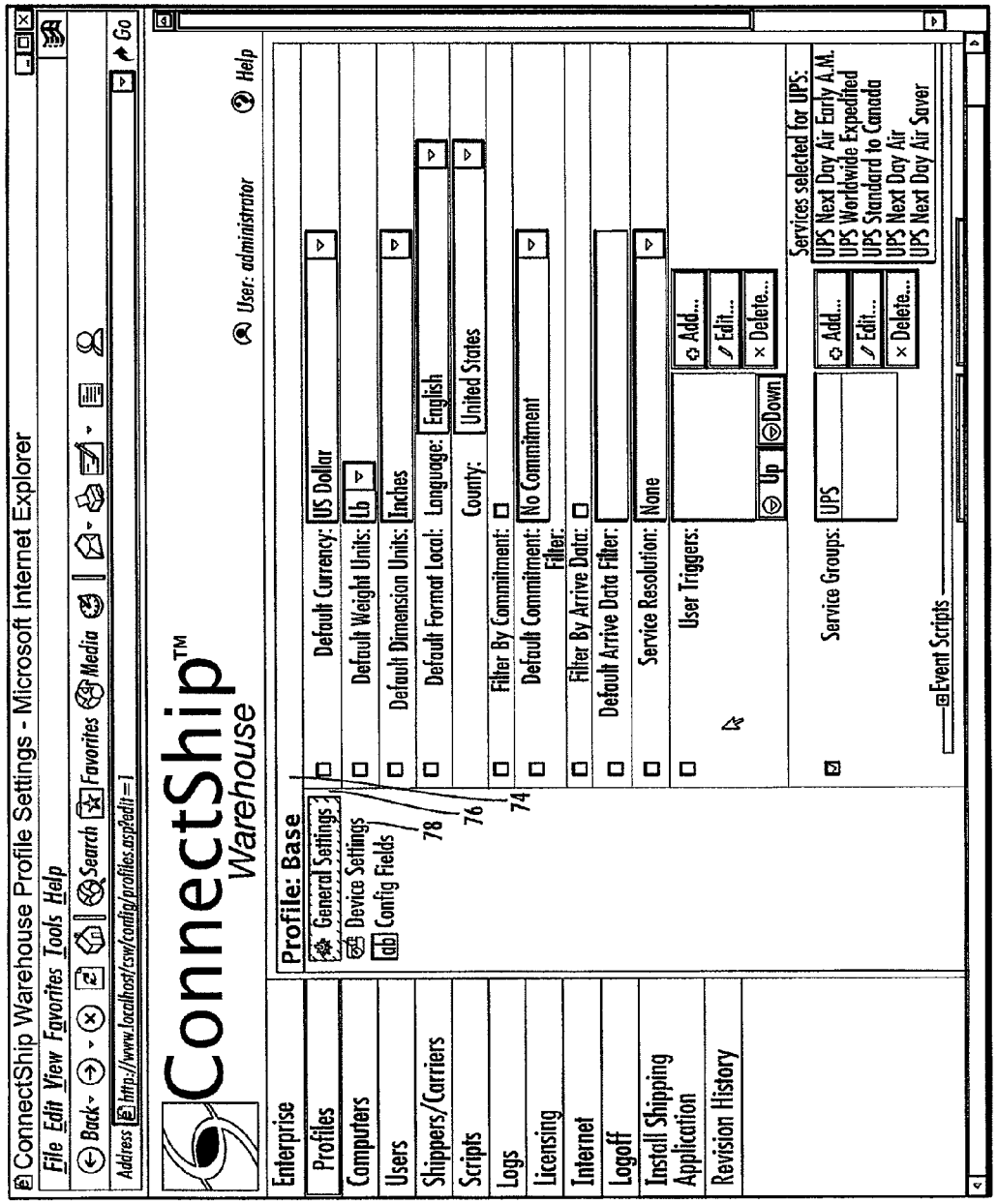
Figure 9B:
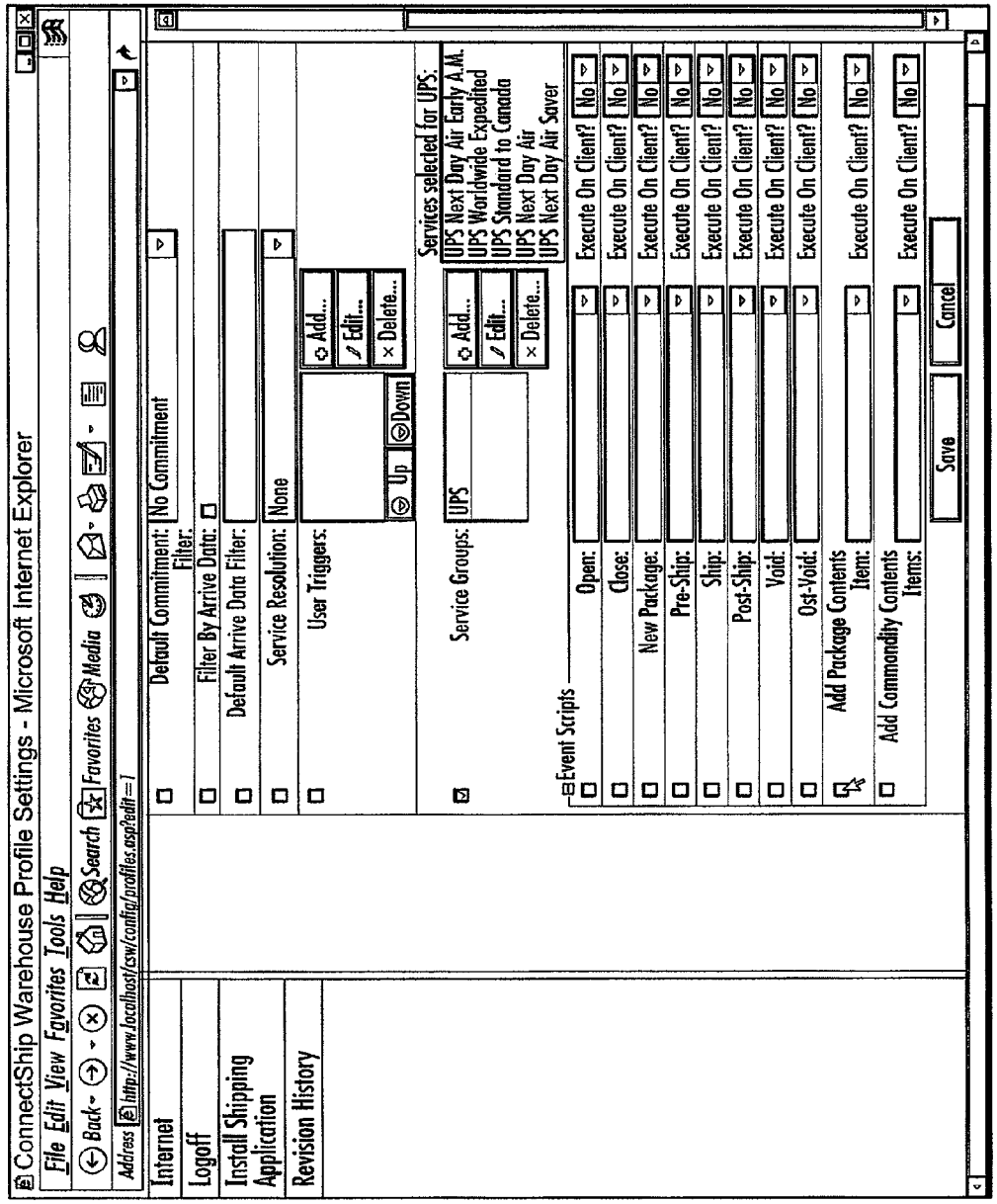
Figure 10A:
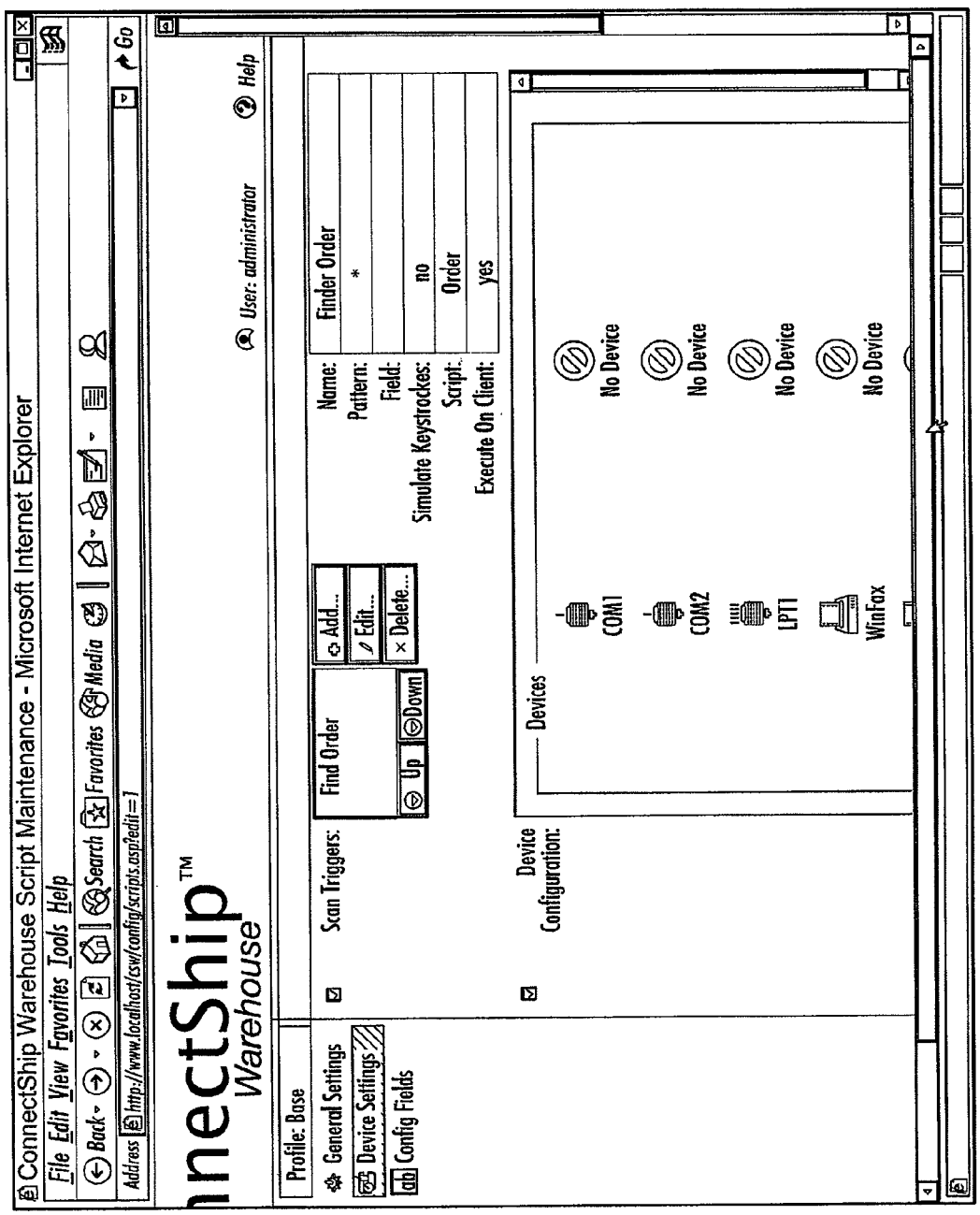
Figure 11A:
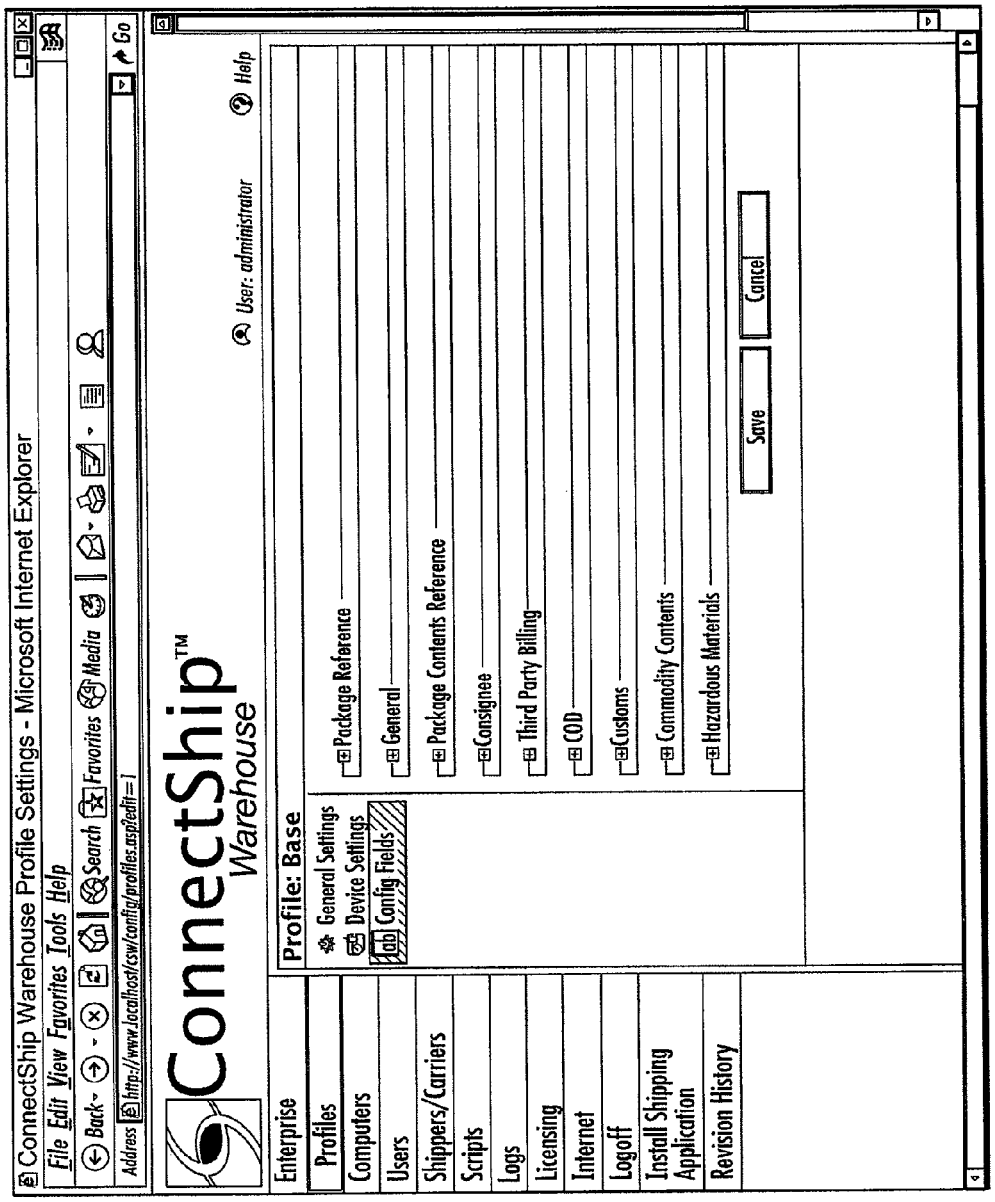
Figure 12:
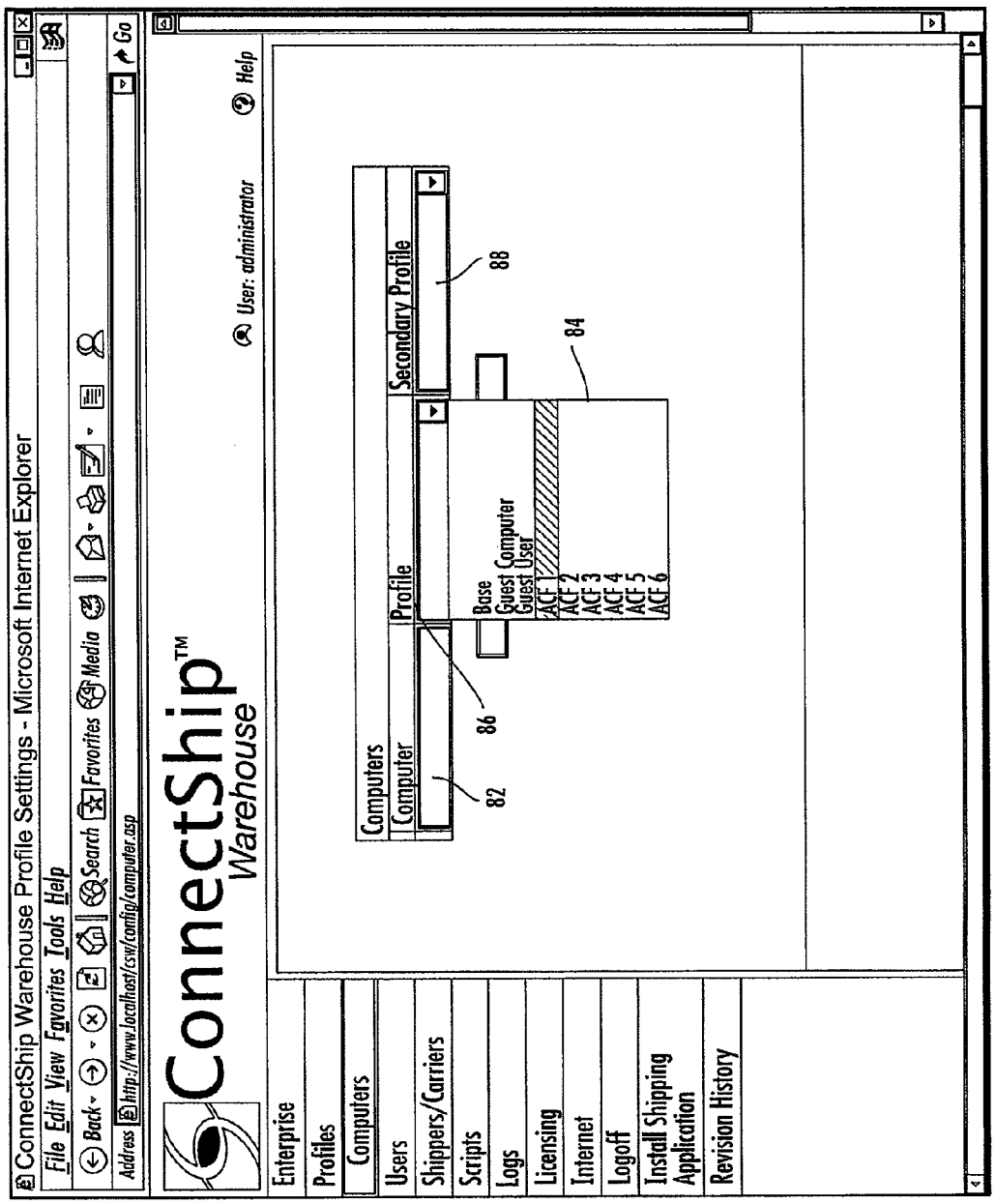
Figure 13:
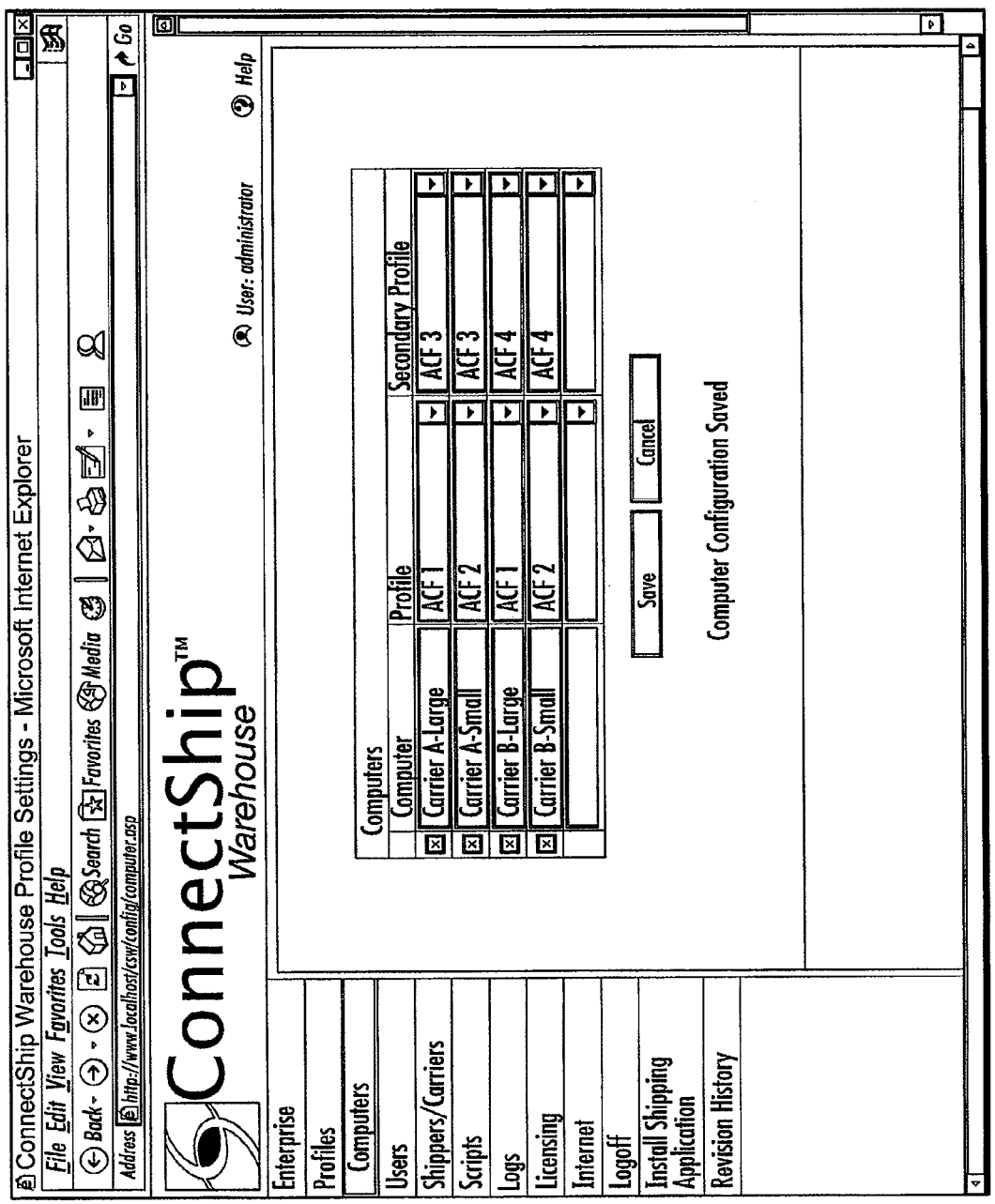
Figure 14:
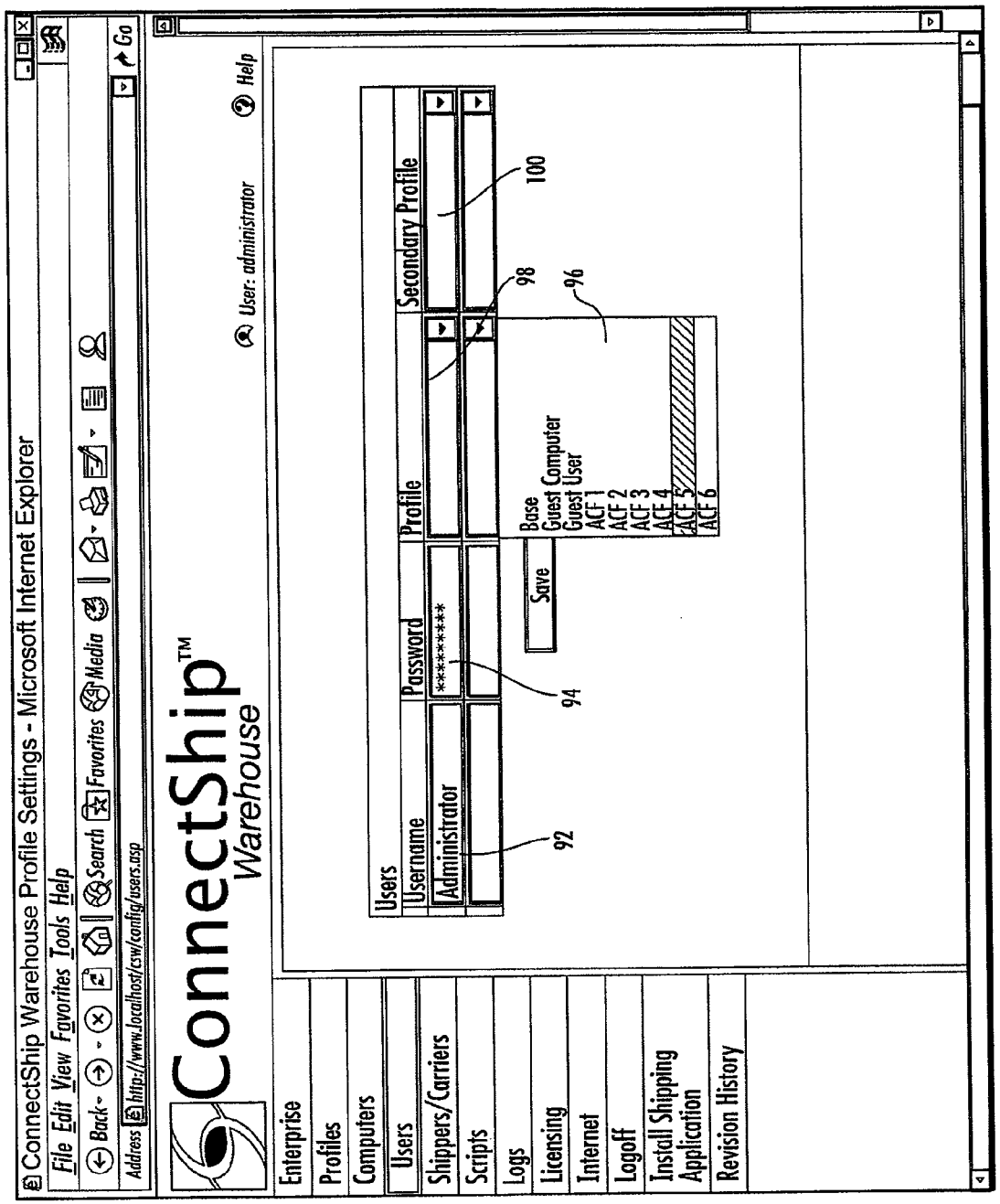
Figure 15:
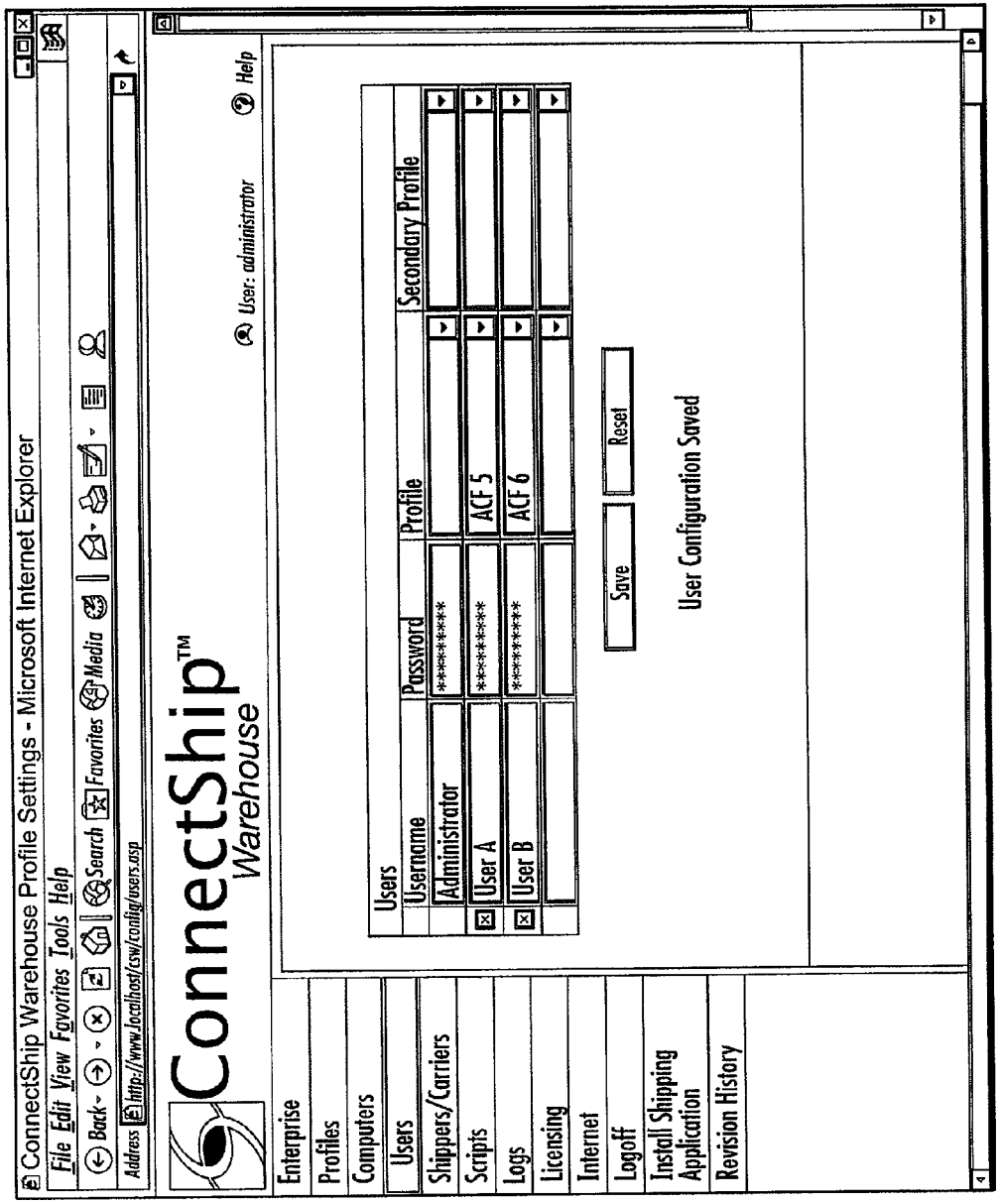

Having thus described the invention in general terms, reference will now be made to the accompanying drawings, which are not necessarily drawn to scale, and wherein:

FIG. 1 is a network diagram of the communication between computing elements and a server of a computing system via a network, according to one embodiment of the present invention;

FIG. 2 is a diagram of the contents of a storage element of a computing system, according to one embodiment of the present invention;

FIG. 3A is a network diagram of a computing system that includes two locations, each with two computing elements utilized by two users, according to one embodiment of the present invention;

FIG. 3B is an alternative configuration of the network diagram of FIG. 3A, according to one embodiment of the present invention;

FIG. 4A is a network diagram of a shipping computing system that includes two loading docks, each with two shipping computers utilized by two user, according to one embodiment of the present invention;

FIG. 4B is an alternative configuration of the network diagram of FIG. 4A, according to one embodiment of the present invention;

FIG. 5 is a diagram illustrating the associations between a plurality of aspect configuration files and the specific users, computing elements and locations of a computing system, according to one embodiment of the present invention;

FIG. 6 is a screen capture displayed to an administrator of a shipping computing system of available configuration files, illustrating the process of creating configuration files, according to one embodiment of the present invention;

FIG. 7 is another screen capture displayed to an administrator of a shipping computing system of the screen of FIG. 5 of available configuration files that includes created aspect configuration files, according to one embodiment of the present invention;

FIGS. 8A and 8B are screen captures displayed to an administrator of a shipping computing system of the screens in which scripts are created, edited, or otherwise manipulated, according to one embodiment of the present invention;

FIGS. 9A and 9B are screen captures displayed to an administrator of a shipping computing system of the configuration attributes that may be activated in the General Settings Category of configuration attributes, according to one embodiment of the present invention;

Figure 10B:
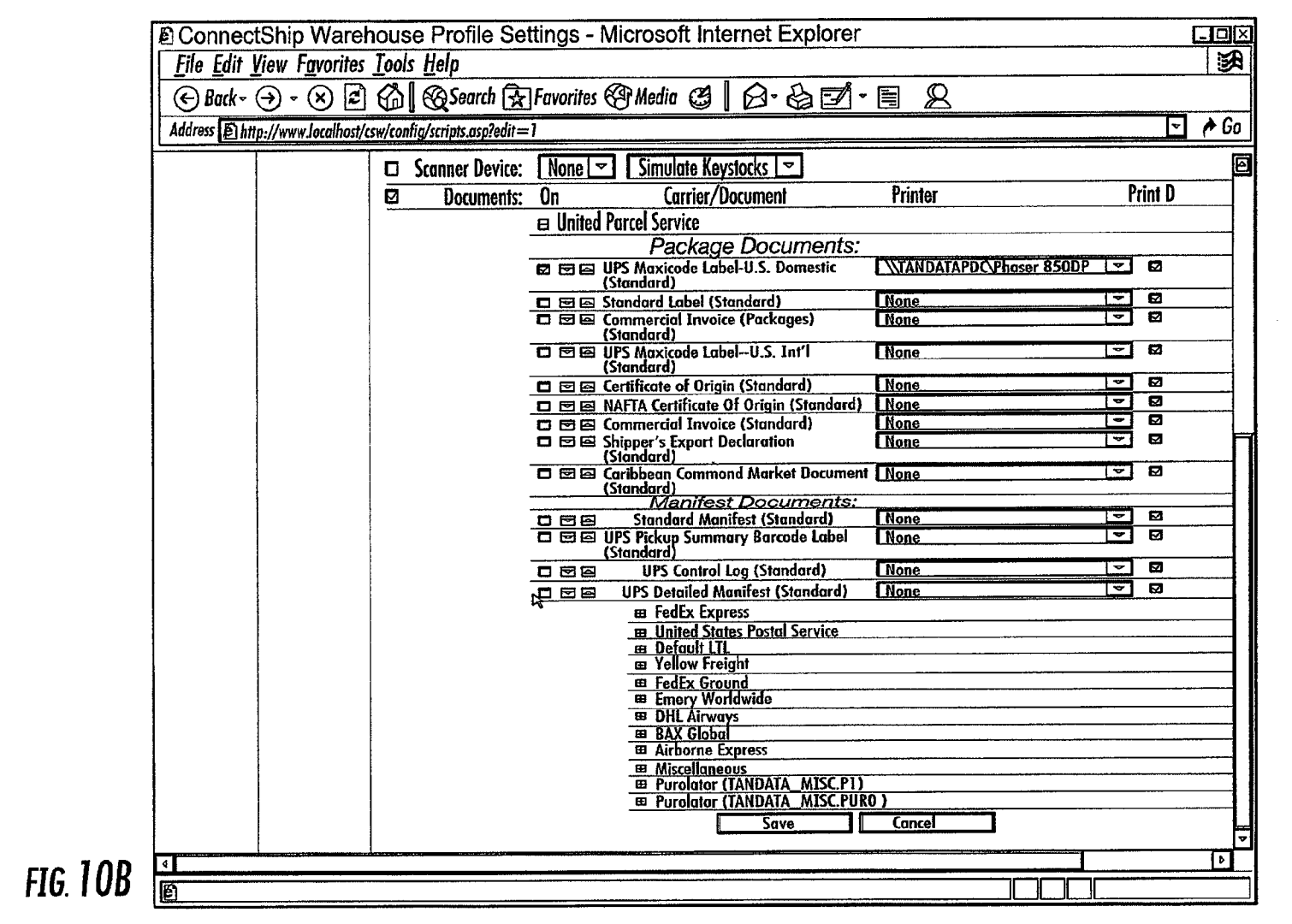

FIGS. 10A and 10B are screen captures displayed to an administrator of a shipping computing system of the configuration attributes that may be activated in the Device Settings Category of configuration attributes, according to one embodiment of the present invention;

Figure 11B:
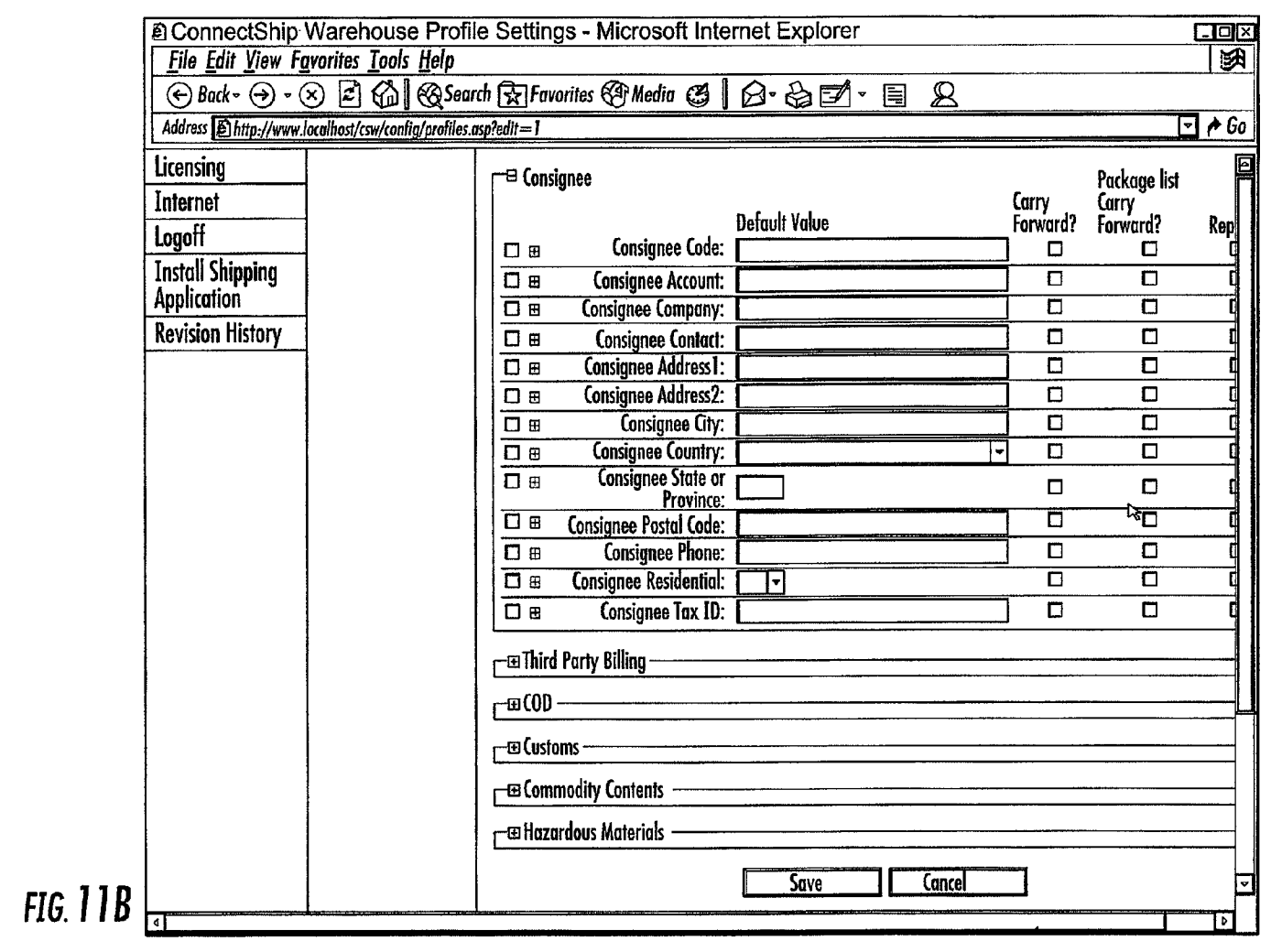

FIGS. 11A and 11B are screen captures displayed to an administrator of a shipping computing system of the configuration attributes that may be activated in the Config Fields Category of configuration attributes, according to one embodiment of the present invention;

FIG. 12 is a screen capture displayed to an administrator of a shipping computing system of the fields available for associating a specific Shipping Computer of the shipping computing system with at least one aspect configuration file, according to one embodiment of the present invention;

FIG. 13 is a screen capture displayed to an administrator of a shipping computing system of the associations between specific Shipping Computers of the shipping computing system with certain aspect configuration files, according to one embodiment of the present invention;

FIG. 14 is a screen capture displayed to an administrator of a shipping computing system of the fields available for associating a specific User of the shipping computing system with at least one aspect configuration file, according to one embodiment of the present invention; and FIG. 15 is a screen capture displayed to an administrator of the shipping computing system of the associations between specific Users of the shipping computing system with certain aspect configuration files, according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The systems and methods of the present invention provide for efficiently configuring computing systems based upon the aspects of the computing system that are present for an operating session of a specific computing system. A session configuration file is generated for the operating session by updating the configuration attributes in a base configuration file with configuration attributes contained in aspect configuration files that are associated with the aspects of the specific computing system, such as the specific computing element, the specific user of the computing element, the specific location of the computing element, and/or any other aspect of the computing system. Thus, a session configuration file may be created for any combination of aspects of the computing system associated with configuration files to properly set up the specific computing system for the particular operating session such that a user and/or administrator does not have to separately configure the computing element.

FIG. 1 is a network diagram of the method and system 20 of one embodiment of the present invention for configuring computing systems, where the computing system includes, but is not limited to, computing elements 22, users of the computing elements, locations of the computing elements, and any other aspect of the computing system that may affect the functionality of the computing element. The system 20 typically includes computing elements 22 and a server 28 connected via a network 26. The system 20 also generally includes a processing component that may reside on the computing element 22 and/or the server 28, as explained more fully hereinbelow. The computing element 22 and the server 28 may be distributed as parts of different workstations, computers, servers or computing devices that may be in different physical locations and in communication with each other via the Internet, intranet or other network 26. To be consistent, the discussion hereinafter refers to the different components of the system 20 as being distributed, unless otherwise stated. In an alternative embodiment, however, a computing element 22 and the server 28 may be part of a single workstation, computer, server or other computing device and, as such, may communicate with each other via internal transmissions.

A storage element may be part of the computing elements 22 and/or the server 28, or may be separate from the computing elements 22 and the server 28, and in communication with the computing elements 22 and server 28 via the Internet, intranet or other network. Regardless of the configuration, the storage element is accessed by the other components of the system 20 via an interface, such as active data object (ADO) interface or open database connectivity (ODBC) interface.

The storage element may be a database or any other storage device known to those skilled in the art.

Computing elements 22 represent the part of the computing system that includes the user interface, which users of the computing system may utilize to perform tasks or activities associated with the computing system. The computing elements 22 may be a laptop computer 32, a personal computer or workstation 34, networked personal computers or workstations 36, or any other type of computing device or configuration operating on any type of computer platform and capable of supporting a user interface. The user interface may be part of an application program that is stored in the computing element 22, and is generally any type of interface that is capable of presenting information to users appropriately, soliciting user input and receiving information from users, and communicating with the network 26. The system 20 may include many client components 22 such that many users may utilize the computing system. The computing element(s) 22 may physically be located anywhere as long as the computing element(s) 22 are in communication with the server 28, storage element and processing component via internal communications, the Internet, intranet or other network 26.

The server 28 of one advantageous embodiment may be an application server, which may utilize any modern operating system, such as Microsoft Windows. An application program may reside on the server 28. Among other functions, the application program provides the information required to perform a task and/or the requested information to the computing element 22 in any appropriate form. The form is viewed by the user as "screens" via computing element 22 and the user interface including, for example, a display. As known to those skilled in the art, the screens may be interactive and prompt the user for the action or information necessary for the computing system to perform the desired functions. The application program stored on the computing element 22 and/or the server 28 may access/query the storage element to provide the content for any of the screens, based upon the actions taken by the user and/or the request of the user.

In order for a computing element 22 to operate properly, it must be configured to include the appropriate parameters for the desired operation. The configuration is typically contained in a configuration file that is stored in a storage element on the computing element 22, the server 28 and/or an independent storage element. The configuration file may include any type of information or directions, i.e. configuration attributes, necessary to ensure that the functionality of the computing element and the application program is presented to the user in the desired manner, the peripheral devices in communication with the computer are set up correctly, and that any other parameter associated with computing element and/or the implementation of the application program has the correct definition.

The configuration attributes also may include the option of linking a script to certain operation(s) of a computing system, such that when the computing system is requested to or automatically performs the certain operation(s) identified in the script, an action associated with the operation(s) is implemented, as specified by the script. The scripting allows organizations to customize the computing system according to their business rules. For example, a script may include directions to display an error message to a user if the user requests the computing system to perform a particular operation that is not permitted by the organization or if there is a more desirable alternative to the requested operation. Thus, the processing element of the present invention recognizes when the certain operations associated with a script automatically occur or are requested by the user and accesses the linked script to implement the action directed in the script.

FIG. 2 illustrates one embodiment of a storage element 38 that includes configuration files 40, an associations table 42, and a sequence 44. The configuration files 40 include a base configuration file 46 and at least one aspect configuration file 48. The base configuration file 46 may include general and/or common configuration attributes for configuring a relatively large group or all of the computing elements in a network of computing systems. The aspect configuration files 48 may include more specific configuration attributes for configuring a relatively smaller group or an individual computing element of the computing system. In addition, the aspect configuration files may be associated with a particular aspect of the computing system, such as the computing elements, the users, the locations, and any other aspect of the computing system, via the associations table 42.

For example, an aspect configuration file may include certain configuration attributes, such as the language used to display the items presented to the user via the user interface, the application programs available to the user, security associated with the user, and any other characteristic that is specific to a particular user, and that aspect configuration file may be associated with a particular user in the computing system as specified in the associations table 42. Other aspect configuration files may include certain configuration attributes, such as instructions regarding the peripheral devices with which a computing element may communicate and how those peripheral devices should operate, the application programs that are resident upon or accessible via the computing element, the activity for which the computing element is designated, and any other instructions regarding the functionality of the computing element, and that aspect configuration file may be associated with a particular computing element in the computing system as specified in the associations table 42. Further aspect configuration files may include configuration attributes for configuring the computing element that are associated, in the associations table 42, with any other aspect of the computing system, such as the location of the computing element or the day of the week of operation of the computing element.

Certain aspects of the computing system may also be associated with a primary aspect configuration file and a secondary aspect configuration file. As such, a particular user may be associated with a primary aspect configuration file that contains configuration attributes that are common to that user and at least one other user. Then, the particular user may also be associated with a secondary aspect file that contains configuration attributes that are specific to that user. For example, if a computing system includes a group of users, where user A is the only Spanish-speaking user, while all of the users in the group have the same security settings, then the primary aspect configuration file associated with user A may include the security configuration attributes that are common to the group of users and the secondary aspect configuration file associated with user A may include the Spanish language configuration attributes specific to user A.

The storage element 38 also may include a sequence 44 of the order in which to update the configuration attributes of the base configuration file 46 with the configuration attributes of the aspect configuration files 48 associated with the specific aspects of a given computing system to thereby generate a session configuration file for the given computing system. For example, as shown in sequence 44, the configuration attributes of the base configuration file 46 are first updated by the primary, then the secondary aspect configuration files associated with the specific computing element of the given computing system, and then updated by the primary, then the secondary aspect configuration files associated with the specific user of the given computing system. In some embodiments of the present invention, the sequence may be altered in order to update the configuration attributes of the base configuration file in the manner that is most advantageous regarding the environment of the computing system.

Updating the configuration attributes of the base configuration file with configuration attributes of certain aspect configuration files may involve overwriting any configuration attribute(s) in the base configuration file that is/are different from the configuration attribute(s) in the particular aspect configuration file with the configuration attribute(s) of the particular aspect configuration file. The resulting group of configuration attributes then may be overwritten by the configuration attributes in aspect configuration files later in the sequence in the same way until the last aspect configuration file in the sequence is reached and that resulting group of configuration attributes comprise the session configuration file.

In a further embodiment of the system of the present invention, the configuration attributes contained in the aspect configuration files 48 may include an activation option. When the activation option for a particular configuration attribute in a configuration file is activated, it may overwrite the same configuration attribute contained in the base configuration file and/or an aspect configuration file earlier in the sequence, whether or not the earlier configuration attribute is activated. In this embodiment, if a configuration attribute of an aspect configuration file later in the sequence is different from a configuration attribute of a configuration file earlier in the sequence, but it is not activated, then the later, different configuration attribute will not overwrite the earlier configuration attribute.

The resulting group of configuration attributes comprise the session configuration file that then may be accessed by the processing element of the present invention and applied to the computing element in order to configure the computing element efficiently and appropriately for the given computing session. While configuring computing systems is described herein as generating a session configuration file by updating configuration attributes in a base configuration file with configuration attributes contained in certain aspect configuration files, the generation of a session configuration file encompasses providing the configuration attributes associated with a given computing system in any manner known to those skilled in the art, which may not include creating a physical session configuration file. In other words, a physical session configuration file does not have to be created. Instead, the processing element of the present invention may merely access the base configuration file and use the configuration attributes in the base configuration file that are not updated by configuration attributes in the applicable aspect configuration file(s). For configuration attributes in the base configuration file that are updated by configuration attributes in the applicable aspect configuration file(s), the processing element may merely access the appropriate aspect configuration file for the given computing system and use those configuration attributes as opposed to the attributes stored in the base configuration file.

In the same way, the base and aspect configuration files are not necessarily physical files. These files also encompass providing the configuration attributes in any manner known to those skilled in the art. One example may include storing all or groups of configuration attributes in a common location or locations, and designating particular configuration attributes as base configuration attributes or aspect configuration attributes. As such, the appropriate configuration attribute(s) may be accessed from the common location(s) as needed.

FIGS. 3A and 3B illustrate an example of the functionality of the systems and methods for controlling the operations of computing systems of the present invention. Although FIGS. 3A and 3B depict a computing system having four computing elements, two users, and two locations, the functionality as described below is applicable in any computing system environment involving more than one computing element, more than one user, and more than one location. The computing system of FIGS. 3A and 3B is in communication with a server 28 via a network 26, as described above.

FIG. 3A illustrates a specific computing system where User A utilizes Computing Element A at Location A and Computing Element C at Location B, and User B utilizes Computing Element B at Location A and Computing Element D at Location B. FIG. 3B illustrates another specific computing system where User B utilizes Computing Element A at Location A and Computing Element C at Location B, and User A utilizes Computing Element B at Location A and Computing Element D at Location B. The users may work at different locations at different times, and, therefore, may utilize the different computing elements at the different locations for any reason, such as the shift they are working, the day of the week, and/or the particular activity being performed by the user. The requirements of these computing systems include: all of the computing elements at Location A must be configured to utilize peripheral devices A, while all of the computing elements at Location B must be configured to utilize peripheral devices B, Computing Elements A and C must be configured to perform Activity A, while Computing Elements B and D must be configured to perform Activity B, and User A must utilize a computing element configured for Spanish-speaking users, while User B must utilize a computing element configured for English-speaking users.

Thus, a system administrator may set up a base configuration file containing all of the configuration attributes common to all of the locations, computing elements, and users. The base configuration file also may contain default settings or instructions for any other configuration attribute, such that if there is no aspect configuration file for a particular aspect, the base configuration file is not overwritten, as described above, and therefore contains the default configuration attributes. Alternatively, the system administrator may prepare default aspect configuration files with the default configuration attributes that will apply if there is no specific aspect configuration file associated with a particular aspect of the specific computing system. The system administrator also may prepare aspect configuration files that include the configuration attributes necessary to meet the above-described requirements of the computing system. For example, aspect configuration file (ACF) 1 and ACF 2 may contain configuration attributes regarding the instructions and/or settings for configuring the computing elements to communicate with peripheral devices A and peripheral devices B, respectively. ACF 3 and ACF 4 may contain the configuration attributes necessary to configure a computing element to perform Activity A and Activity B, respectively. Also, ACF 5 and ACF 6 may contain the configuration attributes necessary to configure a computing element to present information to users in Spanish and English, respectively. In addition, the administrator may prepare scripts and specify links to the scripts in the configuration attributes of any of the aspect configuration files described above. The scripts include instructions for the processing element to implement an action when certain operations of the computing system occur. For instance, ACF 3 and ACF 4 may include a link to a script that includes instructions to display an error message or a message listing an alternative to the user of the computing element when the user requests operations that cannot or should not be performed with respect to Activity A or Activity B, respectively.

The system administrator then may associate one or more of ACF 1 through 6 with the certain aspects of the computing system. For instance, ACF 1 may be associated with Location A to ensure that computing elements at Location A are configured for peripheral devices A, ACF 2 may be associated with Location B to ensure that computing elements at Location B are configured for peripheral devices B, ACF 3 may be associated with Computing Elements A and C to ensure Computing Elements A and C are configured for Activity A, ACF 4 may be associated with Computing Elements B and D to ensure Computing Elements B and D are configured for Activity B, ACF 5 may be associated with User A to ensure that whichever computing element User A is utilizing is configured to present information to User A in Spanish, and ACF 6 may be associated with User B to ensure that whichever computing element User B is utilizing is configured to present information to User B in English. This system also may include a sequence of updating the base configuration file with the Location ACF, then the Computing Element ACF, and then the User ACF. Therefore, as shown in FIG. 3A, when User A initiates an operating session on Computing Element A in Location A, which comprises a specific computing system, the processing element accesses the base configuration file and updates it with the appropriate aspect configuration files, which are ACF 1 (i.e., location ACF), ACF 3 (i.e., computing element ACF), and ACF 5 (i.e., user ACF) in this example, in order to generate the session configuration file that configures Computing Element A to communicate with peripheral devices A, to perform activity A, and to present information to User A in Spanish. In the same way, when User B initiates an operating session on Computing Element B in Location A, the processing element accesses the base configuration file and updates it with ACF 1 (i.e., location ACF), ACF 4 (i.e. computing element ACF), and ACF 6 (i.e., user ACF) in order to generate the session configuration file that configures Computing Element B to communicate with peripheral devices A, to perform activity B, and to present information to User B in English. When User A initiates an operating session on Computing Element C in Location B, the processing element accesses the base configuration file and updates it with ACF 2 (i.e., location ACF), ACF 3 (i.e., computing element ACF), and ACF 5 (i.e. user ACF) in order to generate the session configuration file that configures Computing Element B to communicate with peripheral devices B, to perform activity A, and to present information to User A in Spanish. Finally, when User B initiates an operating session on Computing Element D in Location B, the processing element accesses the base configuration file and updates it with ACF 2 (i.e., location ACF), ACF 4 (i.e., computing element ACF), and ACF 6 (i.e., user ACF) in order to generate the session configuration file that configures Computing Element D to communicate with peripheral devices B, to perform activity B, and to present information to User B in English.

As shown in FIG. 3B, however, when User B initiates an operating session on Computing Element A in Location A the computing element must now be configured to operate in English for User B. As such, the processing element of the present invention accesses the base configuration file and updates it with ACF 1, ACF 3, and ACF 6 in order to generate the session configuration file that configures Computing Element A to communicate with peripheral devices A, to perform activity A, and to present information to User B in English. When User A initiates an operating session on Computing Element B in Location A, the processing element accesses the base configuration file and updates it with ACF 1, ACF 4, and ACF 5 in order to generate the session configuration file that configures Computing Element B to communicate with peripheral devices A, to perform activity B, and to present information to User A in Spanish. When User B initiates an operating session on Computing Element C in Location B, the processing element accesses the base configuration file and updates it with ACF 2, ACF 3, and ACF 6 in order to generate the session configuration file that configures Computing Element B to communicate with peripheral devices B, to perform activity A, and to present information to User B in English. Finally, when User A initiates an operating session on Computing Element D in Location B, the processing element accesses the base configuration file and updates it with ACF 2, ACF 4, and ACF 5 in order to generate the session configuration file that configures Computing Element D to communicate with peripheral devices B, to perform activity B, and to present information to User A in Spanish.

Although not shown in FIG. 3A or 3B, the computing elements may also change locations and continue to be configured properly. For example, User A may initiate an operating session on Computing Element C in Location A, which comprises a specific computing system, and the processing element of the present invention may access the base configuration file and update it with the appropriate aspect configuration files, which are ACF 1 (i.e., location ACF), ACF 3 (i.e., computing element ACF), and ACF 5 (i.e., user ACF) in this example, in order to generate the session configuration file that configures Computing Element C to communicate with peripheral devices A, to perform activity A, and to present information to User A in Spanish. In the same way, when User B initiates an operating session on Computing Element D in Location A, the processing element accesses the base configuration file and updates it with ACF 1 (i.e., location ACF), ACF 4 (i.e. computing element ACF), and ACF 6 (i.e., user ACF) in order to generate the session configuration file that configures Computing Element D to communicate with peripheral devices A, to perform activity B, and to present information to User B in English. When User A initiates an operating session on Computing Element A in Location B, the processing element accesses the base configuration file and updates it with ACF 2 (i.e., location ACF), ACF 3 (i.e., computing element ACF), and ACF 5 (i.e. user ACF) in order to generate the session configuration file that configures Computing Element A to communicate with peripheral devices B, to perform activity A, and to present information to User A in Spanish. Finally, when User B initiates an operating session on Computing Element B in Location B, the processing element accesses the base configuration file and updates it with ACF 2 (i.e., location ACF), ACF 4 (i.e., computing element ACF), and ACF 6 (i.e., user ACF) in order to generate the session configuration file that configures Computing Element B to communicate with peripheral devices B, to perform activity B, and to present information to User B in English.

The system for controlling computing systems of the present invention therefore permits any given user to access any given computing element at any given location and the particular computing element is appropriately configured for the specific operating session without requiring the user and/or the administrator to expend time and labor in the configuration process. In addition, the computing elements and/or the users may move locations or change activities and the computing elements continue to be configured appropriately based upon the specific aspects of the computing system that are present for a given operating session of the computing system. Furthermore, because the configuration files are stored in a central location and because the configuration files may be prepared to contain only general or specific configuration attributes, if a reconfiguration of the any or all of the computing system is necessary, then the administrator can easily make the changes by accessing only the configuration file that contains the activated configuration attribute.

To further explain the systems and methods for controlling the operations of computing systems of the present invention, a description of a specific embodiment for controlling the operations of shipping computing systems is included hereinbelow. The systems and methods of the present invention are advantageous in organizations that manage package shipment operations because those organizations typically have various users that utilize various types of shipping computers at various locations in order to perform shipping operations around the clock, for different types and sizes of packages that are shipped to their destination via various carriers.

FIGS. 4A and 4B illustrate an example of the functionality of the systems and methods for controlling the operations of computing systems of the present invention, as applied in a shipping environment. Although FIGS. 4A and 4B depict a shipping computing system having four computing elements, i.e., Carrier Shipping Computers, two users, and two locations, i.e. Loading Docks, the functionality as described below is applicable in any computing system environment involving more than one computing element, more than one user, and more than one location. The computing system of FIGS. 4A and 4B is in communication with a server 28 via a network 26, as described above.

FIG. 4A illustrates a specific shipping computing system where User A utilizes the Carrier A Shipping Computer for shipping large packages at Loading Dock A and the Carrier A Shipping Computer for shipping small packages at Loading Dock B, and User B utilizes the Carrier B Shipping Computer for shipping large packages at Loading Dock A and the Carrier B Shipping Computer for shipping small packages at Loading Dock B. FIG. 4B illustrates another specific shipping computing system where User B utilizes the Carrier A Shipping Computer for shipping large packages at Loading Dock A and the Carrier A Shipping Computer for shipping small packages at Loading Dock B, and User A utilizes Carrier B Shipping Computer for shipping large packages at Loading Dock A and the Carrier B Shipping Computer for shipping small packages at Loading Dock B. The requirements of these computing systems include: all of the Shipping Computers at Loading Dock A must be configured to utilize certain large package peripheral devices, such as scales to weigh large packages or pallets, while all of the Shipping Computers at Loading Dock B must be configured to utilize certain small package peripheral devices, such as small scales to weigh letters or small packages. The large package Shipping Computers for Carriers A and B must be configured to perform large package shipping and for any operations that are unique to Carrier A and B, respectively, while small package Shipping Computers for Carriers A and B must be configured to perform small package shipping and for any operations that are unique to Carrier A and B, respectively. For example, Carrier A Shipping Computers may require communications with one set of label printers, document printers, and/or scanning devices that are specific to Carrier A, while Carrier B Shipping Computers may require communications with another set of label printers, document printers, and/or scanning devices that are specific to Carrier B. In addition, User A must utilize a Shipping Computer configured for Spanish-speaking users, while User B must utilize a Shipping Computer configured for English-speaking users.

As explained hereinabove and further hereinbelow, the system for controlling computing systems of the present invention provides flexibility and efficiency in configuring computing elements of computing systems by permitting any given user to access any given computing element at any given location and the particular computing element is appropriately configured for the specific operating session without requiring the user and/or the administrator to expend time and labor in the configuration process. Furthermore, the computing elements may change locations and continue to be configured appropriately. FIG. 5 illustrates a computing system that has at least three aspects, i.e., users (U), computing elements (C), and locations (L). The specific aspects, i.e., U1-U5, C1-C4, L1-L3, then may be associated with particular aspect configuration files, i.e., A1-A11, that each contain configuration attributes to configure the computing element of a specific operating session of the computing system appropriately, where a specific operating session of the computing system comprises at least a user, a computing element, and a location. If the specific aspect(s) present for a given operating session are associated with aspect configuration file(s), according to the associations table described with reference to FIG. 2 above, then the configuration attributes in that/those aspect configuration file(s) may update the base configuration file to provide a set of configuration attributes specific to the given operating session. For example, for one given operating session of the computing system that comprises U1, C1 and L1, aspect configuration files A10 (associated with U1), A9 (associated with C1), and A11 (associated with A11) will update the base configuration file for this computing system according the sequence for this computing system, as described above. In another given operating session of the computing system that comprises U5, C4, and L3, aspect configuration file A1 is associated with all three aspects, so the configuration attributes in A1 will update the base configuration file for this computing system. In either of these examples, if no aspect configuration file was associated with at least one of the user, the computing element, and the location, then either a generic/default aspect configuration file associated with users, computing elements, and locations, respectively, of the computing system may be accessed or the default configuration attributes in the base configuration file would apply for any configuration attribute not overwritten by the aspect configuration files that are associated with aspects of the specific computing system operating session.

The versatility of this system is provided by the configuration files that each contain all of the configuration attribute options that are appropriate for a given organization's computing system. The system administrator typically assesses the overall requirements, characteristics, and functions of the organization's computing system and prepares the aspect configuration files accordingly. For instance, if all of the users in the computing system prefer to have information presented to them on the computing element in English, but each user works with different currencies, then the system administrator will specify the English-language configuration attribute in a configuration file that contains general/common configuration attributes that will apply to all operating sessions of the computing system, such as in the base configuration file or a general aspect configuration file, while a specific currency configuration attribute is specified in an aspect configuration file that is associated with each particular user. Alternatively, if the users in the computing system speak a variety of languages, but work with the same currency, then the system administrator will specify the particular language configuration attribute in an aspect configuration file that contains specific configuration attributes associated with each particular user or group of users, while the currency configuration attribute is specified in a configuration that will apply to all operating sessions of the computing system, such as in the base configuration file or a general aspect configuration file. Thus, the system administrator can prepare as many configuration files as necessary by activating the desired configuration attributes in each file, specifying any other information necessary for the particular configuration attributes, and associating the configuration files with the desired specific aspect(s) of the computing system. In addition, the system administrator may prepare default configuration files that will apply when no aspect configuration file is associated with a specific aspect of the computing system, as described above.

In light of this, the shipping computing systems must be configured such that each Shipping Computer at a specific location for a specific carrier and a specific user is properly configured for operation. This is typically performed by a system administrator in the present invention. The administrator performs the functions described above through an administration system, referred to by the Assignee of this application as Connectship Warehouse™, but referred to herein as the administration system. The administration system provides the user interface and functionality for the administrator to properly prepare configuration files with the appropriate configuration attributes and to associate the configuration files with the appropriate aspects of the computing system. This includes preparing scripts or linking existing scripts to certain operations of the computing system. In addition, the administration system provides access for the administrator to make changes to the centrally stored configuration files when necessary.

Specifically, a system administrator may access a screen of the administration system, such as a browser-based user interface screen, to prepare the desired configuration files, as shown in FIG. 6. Each configuration file, as illustrated in the screen captures below, may have the same options of configuration attributes from which the administrator may choose when activating the particular attributes included in the configuration files. Please note that in the screen capture shown in FIG. 6 and in all of the screen capture figures referred to hereinafter, a profile is equivalent to a configuration file, but the term configuration file is used throughout most of this specification for consistency. It is understood, however, that the term profile and configuration file are analogous terms. To access the configuration files screen, the administrator may select the profiles option 50 from the menu 52. The screen of FIG. 6 depicts the configuration file list 54, which contains the base configuration file and two default configuration files. The system administrator may set up a base configuration file containing all of the configuration attributes common to all of the loading docks, shipping computers, and users by selecting the Base configuration file indication 56. The base configuration file also may contain default settings or instructions for any other configuration attribute, such that if there is no aspect configuration file for a particular aspect of a specific shipping computing system, the base configuration file is not overwritten, and therefore contains the default configuration attributes. Alternatively, the system administrator may prepare default aspect configuration files, as described above, such as the Guest Computer configuration file by selecting the Guest Computer indication 58 and the Guest User configuration file by selecting the Guest User indication 60, with the default configuration attributes that will apply if there is no aspect configuration file associated with the particular Shipping Computer and/or User of the specific shipping computing system.

The system administrator also may prepare aspect configuration files that include the configuration attributes necessary to meet the above-described requirements of the shipping computing system. To create aspect configuration files, the name of the aspect configuration file is entered in area 62 and the Add indication 64 is selected. FIG. 7 is a screen capture of the list of configuration files when six aspect configuration files, ACF 1 through ACF 6, have been added to the configuration file list. By selecting the ACF indication 66 for the desired aspect configuration file, the system administrator may access the configuration attribute options for that aspect configuration file. The administrator may delete any of the aspect configuration files by selecting the delete indication 68 associated with file.

If the administrator plans to link scripts to certain actions that may be requested by the user of the shipping system or automatically performed by the shipping system, such that the script implements a particular operation when the action occurs, the administrator may select the Scripts option 70 from the menu 52 to access the screen of FIG. 8A. As FIG. 8A illustrates, a new script may be created by entering the name of the new script and selecting the Add indication in area 72. The screen of FIG. 8B then may be presented to the administrator where the administrator may select an existing script name to edit, to upload to the shipping application, to download from the shipping application, or to delete. FIG. 8B shows how an existing script may be edited and saved via the administration system. The scripts are text files that may be created and edited with any type of text editor known to those skilled in the art, and written in script language, such as Microsoft's VBScript language, such that the scripts may be accessed and implemented by the processing element upon the occurrence of the operation(s) associated with the script, which is described below.

After selecting the indication 66 for any of the aspect configuration files, the screen of FIG. 9A may be displayed and the administrator may select one of General Settings 74, Device Settings 76, or Config Fields 78. In any of the categories, to activate particular configuration attributes, an activation area near the desired attribute may be selected. If General Settings 74 is selected, or, in this embodiment, the General Settings screen is automatically selected as the default when the indication 66 for an aspect configuration file is selected, the screens of FIGS. 9A and 9B are displayed and the administrator may activate the desired general setting configuration attributes by selecting the activation area near the desired configuration attribute and providing the requested information regarding the attribute. The configuration attributes that the administrator may activate in the General Settings category include, but are not limited to, the default currency to be used when displaying shipping rates, the default units of measure to use when package dimensions and/or weight are entered into the shipping computing system, the country where the Shipping Computer is located, the language in which to present information to the user, linking a script to a selection indication, such as an icon, in the shipping application or to an action, and creating service groups to include any combination of shipping services available to the organization, such as a group that includes all of the "next day" shipping services. To link a script to a selection indication or an action, the administrator may select the appropriate script from the list of existing scripts, which is created as described with respect to FIGS. 8A and 8B, and choose whether to have the script execute on the client.

If Device Settings 76 is selected, the administrator may select the configuration attributes associated with the various peripheral devices in communication with the computing system network. As FIG. 10A illustrates, the administrator has the option of selecting a communications port of the Shipping Computer to associate with the appropriate peripheral devices, such as printer(s), scale(s) and/or scanner(s), for the particular shipping computing system of this example. FIG. 10A also illustrates that the administrator has the option to create scan templates to sort the information contained in a bar code, which facilitates the utilization of the bar code information by the shipping application. The administrator also may assign scripts to the template that may execute when a particular scan is identified, as shown in FIG. 10A. To link a script to a template, the administrator may specify the particular script from the list of existing scripts, which is created as described with respect to FIGS. 8A and 8B. If the device associated with the selected port is a printer, the administrator also may select the type of printing stock to be used by the printer. As FIG. 10B illustrates, once printers are assigned, the administrator may assign specific reports or label to particular printers, such that the labels print on the label printers and other documents or reports print on other printers.

If Config Fields 78 is selected, the administrator may select the configuration attributes associated with shipping-related features. As FIGS. 11A and 11B illustrate, the administrator may select a group of shipping-related configuration attributes and activate configuration attributes within that category. The groups include, but are not limited to, package references, payment terms, customs information, hazardous materials information and consignee information. Within these groups may be options to specify default values for the field prompts on the screens and to link scripts to fields of the screen that may execute when the field changes. To link a script to a field, the administrator may select the appropriate script from the list of existing scripts, which is created as described with respect to FIGS. 8A and 8B. FIG. 11B illustrates a screen capture when the consignee group has been selected. In addition, the package reference group in the Field Config category includes the option of customizing the field prompts. For instance, if an organization uses a particular phrase, such as "Order Number," "Reference Number," or "Shipment Number," to indicate the number associated with a shipment, then that field prompt can be customized for that phrase.

Therefore, in the example illustrated in FIGS. 4A and 4B, the administrator may prepare ACF 1 and ACF 2 to contain configuration attributes regarding the instructions and/or settings for configuring the large package peripheral devices, such as the large package scale(s), and the small package peripheral devices, such as the small package scale(s), respectively, by specifying the appropriate devices in the Device Settings Category, as described above. The administrator may also prepare ACF 3 and ACF 4 to contain the configuration attributes necessary to configure a Shipping Computer to carry out shipments for Carrier A and Carrier B, respectively, by specifying the appropriate devices in the Device Settings Category, such as label printers and scanners, as described above, for each Carrier. In addition, the administrator may prepare ACF 5 and ACF 6 to contain the configuration attributes necessary to configure a Shipping Computer to present information to users in Spanish and English, respectively, by specifying the appropriate language in the General Settings Category, as described above.

The system administrator then may associate ACF 1 through 6 with certain aspects of the shipping computing system, which in this example are the Users and the Computers of the shipping computing system, but may be expanded to include any aspect of the shipping computing system, if desired. To associate the configuration files with specific Shipping Computers of the shipping computing system, the administrator may select the Computers option 80 from the menu 52. FIG. 12 illustrates the screen that the administrator may use to make the associations between the specific Shipping Computers by entering the name of the Shipping Computer in the Computer Field 82 and selecting the appropriate configuration file from the list of available configuration files 84 to enter in the Profile, i.e., primary configuration file, field 86 and/or the Secondary Profile, i.e., secondary configuration file, field 88. For instance, ACF 1 may be associated with the Shipping Computers at Loading Dock A to ensure that Shipping Computers at Loading Dock A are configured for large package peripheral devices, by associating the large package Carrier A and Carrier B Shipping Computers, i.e., Carrier A-large and Carrier B-large, with ACF 1 as the primary configuration file, as shown in FIG. 13. ACF 2 may be associated with the Shipping Computers at Loading Dock B to ensure that Shipping Computers at Loading Dock B are configured for small package peripheral devices, by associating the small package Carrier A and Carrier B Shipping Computers, i.e., Carrier A-small and Carrier B-small, with ACF 2 as the primary configuration file, as shown in FIG. 13. ACF 3 may be associated with the Carrier A Shipping Computers to ensure that the Carrier A Shipping Computers are configured for the peripheral devices related to Carrier A, such as certain label printers and scanners, by associating the Carrier A-large and Carrier A-small Shipping Computers with ACF 3 as the secondary configuration file, as shown in FIG. 13. ACF 4 may be associated with Carrier B Shipping Computers to ensure that the Carrier B Shipping Computers are configured for the peripheral devices related to Carrier B, such as certain label printers and scanners, by associating the Carrier B-large and Carrier B-small Shipping Computers with ACF 4 as the secondary configuration file, as shown in FIG. 13.

To associate the configuration files with specific Users of the Shipping Computers in the shipping computing system, the administrator may select the Users option 90 from the menu 52. FIG. 14 illustrates the screen that the administrator may use to make the associations between the specific Users by entering the name of the User and the User's password, if appropriate, in the Username Field 92 and the Password Field 94, respectively, and by selecting the appropriate configuration file from the list of available configuration files 96 to enter in the Profile, i.e., primary configuration file, field 98 and/or the Secondary Profile, i.e., secondary configuration file, field 100. For instance, ACF 5 may be associated with User A to ensure that the Shipping Computer User A is utilizing is configured to present information to User A in Spanish, by associating the username User A with ACF 5 as the primary configuration file, as shown in FIG. 15. ACF 6 may be associated with User B to ensure that the Shipping Computer User B is utilizing is configured to present information to User B in English, by associating the username User B with ACF 6 as the primary configuration file, as shown in FIG. 15. While this example does not specify secondary configuration files associated with User A or User B, secondary configuration files may be specified if necessary to further customize the operating sessions initiated by User A and/or User B on the Shipping Computers. These associations may be stored in the associations table and described with reference to FIG. 2

This shipping computing system example also may include a sequence for updating the base configuration file with the aspect configuration files. In this example, the base configuration file is first updated with the primary, then secondary, configuration files associated with the Shipping Computer of the specific shipping computing system. The results of the Shipping Computer update to the base configuration file are then updated by the primary, then secondary, configuration file associated with the User of the specific shipping computing system. The sequence most likely may be hard-coded in the processing element to provide a uniform updating process for each specific computing system, or it may be easily accessible and modifiable by the administrator. The configuration attributes, associations and sequence described above are just one example of the multiple ways that the configuration files may be prepared, associated with certain aspects and updated in order to generate the session configuration file. Thus, the systems and methods of the present invention provide versatility and flexibility for configuring computing elements in way that satisfies all of the requirements of the computing system.

As shown in FIG. 4A, when User A initiates an operating session on the Carrier A Shipping Computer on Loading Dock A, which comprises a specific shipping computing system and operating session, the processing element of the present invention accesses the base configuration file and updates it with the appropriate aspect configuration files based upon the associations table and in an order based upon the sequence. Thus, the base configuration file is first updated with the primary Computer configuration file, ACF 1, then the secondary Computer configuration file, ACF 3, then the primary User configuration file, ACF 5, and finally the secondary User configuration file, which is not specified in this example, so the results after the ACF 5 update are the final results for the generation of the session configuration file that configures the Carrier A Shipping Computer to communicate with both the large package and Carrier A peripheral devices, to perform the large package shipping, and to present information to User A in Spanish. In the same way, when User B initiates an operating session on the Carrier B Shipping Computer on Loading Dock A, which comprises a specific shipping computing system and operating session, the processing element accesses the base configuration file and updates it with the appropriate aspect configuration files based upon the associations table and in an order based upon the sequence. Thus, the base configuration file is first updated with the primary Computer configuration file, ACF 1, then the secondary Computer configuration file, ACF 4, then the primary User configuration file, ACF 6, and finally the secondary User configuration file, which is not specified in this example, so the results after the ACF 6 update are the final results for the generation of the session configuration file that configures the Carrier B Shipping Computer to communicate with both the large package and Carrier B peripheral devices, to perform the large package shipping, and to present information to User B in English.

Furthermore, when User A initiates an operating session on the Carrier A Shipping Computer on Loading Dock B, the processing element accesses the base configuration file and updates it with the appropriate aspect configuration files based upon the associations table and in an order based upon the sequence. Thus, the base configuration file is first updated with the primary Computer configuration file, ACF 2, then the secondary Computer configuration file, ACF 3, then the primary User configuration file, ACF 5, and finally the secondary User configuration file, which is not specified in this example, so the results after the ACF 5 update are the final results for the generation of the session configuration file that configures the Carrier A Shipping Computer to communicate with both the small package and Carrier A peripheral devices, to perform the small package shipping, and to present information to User A in Spanish. Finally, when User B initiates an operating session on the Carrier B Shipping Computer on Loading Dock B, the processing element of the present invention accesses the base configuration file and updates it with the appropriate aspect configuration files based upon the associations table and in an order based upon the sequence. Thus, the base configuration file is first updated with the primary Computer configuration file, ACF 2, then the secondary Computer configuration file, ACF 4, then the primary User configuration file, ACF 6, and finally the secondary User configuration file, which is not specified in this example, so the results after the ACF 6 update are the final results for the generation of the session configuration file that configures the Carrier B Shipping Computer to communicate with both the small package and Carrier B peripheral devices, to perform the small package shipping, and to present information to User B in English.

As shown in FIG. 4B, however, when User B initiates an operating session on the Carrier A Shipping Computer on Loading Dock A, the processing element accesses the base configuration file and the associations table, and updates the base configuration file with ACF 1, ACF 3, and ACF 6, in the same way as described in the FIG. 4A example, in order to generate the session configuration file that configures the Carrier A Shipping Computer to communicate with both the large package and Carrier A peripheral devices, to perform large package shipping, and to present information to User B in English. Similarly, when User A initiates an operating session on the Carrier B Shipping Computer on Loading Dock A, the processing element accesses the base configuration file and the associations table, and updates the base configuration file with ACF 1, ACF 4, and ACF 5 in order to generate the session configuration file that configures the Carrier B Shipping Computer to communicate with both the large package and Carrier B peripheral devices, to perform large package shipping, and to present information to User A in Spanish. Furthermore, when User B initiates an operating session on the Carrier A Shipping Computer on Loading Dock B, the processing element accesses the base configuration file and the associations table, and updates the base configuration file with ACF 2, ACF 3, and ACF 6 in order to generate the session configuration file that configures the Carrier A Shipping Computer to communicate with both the small package and Carrier A peripheral devices, to perform small package shipping, and to present information to User B in English. Finally, when User A initiates an operating session on the Carrier B Shipping Computer on Loading Dock B, the processing element accesses the base configuration file and the associations table, and updates the base configuration file with ACF 2, ACF 4, and ACF 5 in order to generate the session configuration file that configures the Carrier B Shipping Computer to communicate with both the small package and Carrier B peripheral devices, to perform small package shipping, and to present information to User A in Spanish.

Thus, the system and methods for configuring computing systems of the present invention provide an administration system that permits the administrator to prepare configuration files to efficiently and flexibly configure any computing element/Shipping Computer appropriately based at least upon the user of the computing element, the location of the computing element and the computing element itself. In addition, the administrator may prepare certain configuration files with general configuration attributes and other configuration files with specific configuration attributes, and may centrally store the configuration files, such that changes to the configuration files are easily made and implemented on the computing elements. Therefore, the present invention allows any user to utilize any computing element in any location, such that the locations of the users and/or the computing elements may change and the computing element will continue to be configured appropriately based upon the specific operating session of the computing system.

Much of the functionality described above is implemented by the processing element of the present invention. Specifically, the processing element referred to in the discussion and examples above may reside on the computing element(s) and/or the server independent of the either the computing element(s) and/or the server, such that the processing element is logically independent from any particular physical computing element or server, while also being accessible by each to perform the appropriate processes. Thus, the computing element(s) may request and receive information without directing or even being aware of how or where the information is processed, which allows the server processing to be decoupled from the computing element and peripheral devices. The processing element may be comprised of interfaces that are available to the computing elements, where the interfaces manage the processing that may occur at the computing elements and/or the server. The interfaces manage the supporting processing for both the static configuration data and the dynamic transaction data, which may be data strings or complex data objects.

If the data that is transferred between the components of the computing system and the server or any other network components is in the form of a complex object, however, both the sending and receiving component must know information about the object, which destroys the location-independence of the processing element. Therefore, when any type of complex data is transferred that requires the sending and receiving components to know information about the data, such as complex object data, the location-independence of the processing element is achieved by converting the data into a representation, such as a string representation, at the sending end of the transfer that can be reconstructed into the complex data at the receiving end. This process may be referred to as deflating the complex data at the sending end into a representation that may be inflated back into the complex data at the receiving end of the communications link.

For example, in the computing system and the shipping computing system described above, the computing element/Shipping Computer may have application software that only has instructions regarding the user interface, how to receive information from the user, and how to request processes or information from the processing component without having to know where the processing takes place. Therefore, any of the actual application processing, such as executing the scripts, generating labels and reports, inserting and looking up entries in an address book, searching the package history for a tracking number, or any other processing is handled by the processing component and the results are presented to the computing element/Shipping Computer, which is unaware of where or how the processing occurs. Because the computing element/Shipping Computer is not a part of the processing management, changes can be made to the application, the data storage, the server, the processing element, or any other component without having to correspondingly make the changes on the computing element/Shipping Computer, which further saves time and labor for users and system administrators that would otherwise have to access the computing element/Shipping Computer in some manner in order to make appropriate changes when any other component of the computing system or network changed.

As explained in the discussion and the examples above, the systems and methods for controlling the operations of a computing system of the present invention provide for configuring a computing element by creating a session configuration file that takes into account all of the requirements and aspects of the computing system that are present for a particular operating session of a specific computing system. Thus, this invention may be utilized in any type of computing system in which the aspects of the computing system are associated with various configuration attributes to efficiently and effectively configure various computing elements to include only the specific configuration attributes applicable to the specific a specific computing system operating session. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer readable medium storing computer readable instructions for controlling operations of a specific computing system, said computer readable medium storing computer-executable instructions for:

retrieving a base configuration file, wherein the base configuration file defines common configuration attributes for a group of users;

retrieving a primary aspect configuration file, wherein the primary aspect configuration file defines common configuration attributes for at least two users within the group of users;

retrieving a secondary aspect configuration file, wherein the secondary aspect configuration file defines configuration attributes for one of the at least two users within the group of users;

overwriting configuration attributes in the base configuration file with configuration attributes in the primary aspect configuration file;

overwriting configuration attributes in the base configuration file with configuration attributes in the secondary aspect configuration file;

generating a session configuration file by saving the updated base configuration file as a session configuration file; and configuring a specific computing system for operation during a particular operating session based on the session configuration file.

2. The computer readable medium of claim 1, wherein overwriting configuration attributes in the base configuration file with configuration attributes in the primary and secondary aspect configuration files is based on a predetermined sequence.

3. The computer readable medium of claim 1, further comprising computer-readable instructions operative for:

receiving one or more activation indications associated with one or more configuration attributes in the primary and secondary aspect configuration files;

generating the session configuration file by updating the configuration attributes in the base configuration file with configuration attributes in the primary and secondary aspect configuration files according to a predetermined sequence and said one or more activation indications.

4. The computer readable medium of claim 1, further comprising computer-readable instructions operative for:

associating the primary aspect configuration file with an aspect selected from the group consisting of: a computing element; a user of the computing element; and a location of the computing element.

5. The computer readable medium of claim 1, further comprising computer-readable instructions operative for:

creating an associations table defining an association between the primary aspect configuration file and an aspect, wherein said aspect is selected from the group consisting of: a computing element; a user of the computing element; and a location of the computing element; and, accessing the associations table to generate the session configuration file.

6. The computer readable medium of claim 1, wherein in the generating step, the configuration attributes in the primary or secondary aspect configuration files include a language used to display a user interface on the specific computer system, and the configuring step comprises configuring the specific computer system to display the user interface in said language.

7. The computer readable medium of claim 1, wherein in the generating step, the configuration attributes in the primary or secondary aspect configuration files include one or more application programs available to a user of the specific computer system, and the configuring step comprises configuring the specific computing system to provide the application programs to the user.

8. The computer readable medium of claim 1, wherein in the generating step, the configuration attributes in the secondary aspect configuration file include security associated with a particular user of the specific computer system, and the configuring step comprises configuring the specific computing system to apply the security to the user.

9. A computer-readable medium storing computer-executable instructions for controlling operations of a specific computing system, said computer-readable medium storing computer-executable instructions for:

retrieving a base configuration file, wherein the base configuration file defines common configuration attributes for a group of users;

overwriting configuration attributes in the base configuration file with configuration attributes in a primary aspect configuration file in a predetermined sequence, wherein the primary aspect configuration file defines common configuration attributes for at least two users within the group of users;

overwriting configuration attributes in the base configuration file with configuration attributes in a secondary aspect configuration file in a predetermined sequence, wherein the secondary aspect configuration file defines configuration attributes for one of the at least two users within the group of users;

generating a session configuration file by saving the updated base configuration file as the session configuration file; and configuring the specific computing system based on the session configuration file.

10. The computer-readable medium of claim 9, wherein said computer-readable medium further stores computer-executable instructions for:

receiving one or more activation indications associated with one or more configuration attributes in the primary and secondary aspect configuration files; and overwriting the configuration attributes in the base configuration file with configuration attributes in the primary and secondary aspect configuration files according to a predefined sequence and said one or more activation indications.

11. The computer-readable medium of claim 9, wherein said computer-readable medium further stores computer-executable instructions for:

associating the primary aspect configuration file with an aspect selected from the group consisting of: a computing element; a user of the computing element; and a location of the computing element.

12. The computer-readable medium of claim 9, wherein said computer-readable medium further stores computer-executable instructions for:

creating an associations table comprising one or more associations between the primary aspect configuration file with one or more aspects; and accessing the associations table to generate the session configuration file.

13. The computer-readable medium of claim 9, wherein said computer-readable medium stores computer-executable instructions for:

generating the session configuration file according to the base configuration file comprising configuration attributes common to general computing systems and the primary aspect configuration file comprising configuration attributes specific to an aspect, wherein said aspect is selected from the group consisting of: a computing element; a user of the computing element; and a location of the computing element.

14. The computer-readable medium of claim 9, wherein the configuration attributes in the primary or secondary aspect configuration files include a language used to display one or more items presented to a particular user via a user interface on the specific computer system, and wherein the session configuration file configures the specific computer system to display the user interface in the language.

15. The computer-readable medium of claim 9, wherein the configuration attributes in the primary or secondary aspect configuration files include one or more application programs available to a user of the specific computer system, and wherein the session configuration file configures the specific computer system to provide the application programs to the user.

16. The computer-readable medium of claim 9, wherein the configuration attributes in the secondary aspect configuration file include security associated with a particular user of the specific computer system, and wherein the session configuration file configures the specific computer system to apply the security to the user.

* * * * *